(12) United States Patent
Das Sharma

(10) Patent No.: US 11,836,101 B2
(45) Date of Patent: Dec. 5, 2023

(54) PARTIAL LINK WIDTH STATES FOR BIDIRECTIONAL MULTILANE LINKS

(71) Applicant: Intel Corporation, Santa Clara, CA (US)

(72) Inventor: Debendra Das Sharma, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 684 days.

(21) Appl. No.: 16/831,719

(22) Filed: Mar. 26, 2020

(65) Prior Publication Data

US 2020/0226084 A1 Jul. 16, 2020

Related U.S. Application Data

(60) Provisional application No. 62/941,277, filed on Nov. 27, 2019.

(51) Int. Cl.
*G06F 13/362* (2006.01)
*H04L 69/324* (2022.01)

(52) U.S. Cl.
CPC .......... *G06F 13/362* (2013.01); *H04L 69/324* (2013.01)

(58) Field of Classification Search
CPC ............................. G06F 13/362; H04L 69/324
USPC ...................................... 710/29, 307
See application file for complete search history.

(56) References Cited

U.S. PATENT DOCUMENTS

| | | | | |
|---|---|---|---|---|
| 4,484,326 A * | 11/1984 | Turner | ................ | H04L 12/5602 370/253 |
| 6,970,013 B1 | 11/2005 | Cory | | |
| 7,136,953 B1 * | 11/2006 | Bisson | ................ | G06F 13/4018 710/29 |
| 7,146,510 B1 * | 12/2006 | Helms | ..................... | G06F 1/324 713/320 |
| 7,230,549 B1 * | 6/2007 | Woodral | ............. | G06F 13/4217 341/100 |
| 7,447,824 B2 * | 11/2008 | Jabori | .................. | G06F 1/3253 710/301 |
| 7,468,754 B2 | 12/2008 | Carlsgaard et al. | | |

(Continued)

OTHER PUBLICATIONS

USPTO; Non-Final Office Action issued in U.S. Appl. No. 16/023,739, dated Aug. 23, 2021; 41 pages.

(Continued)

*Primary Examiner* — Paul R. Myers

(74) *Attorney, Agent, or Firm* — Alliance IP, LLC

(57) ABSTRACT

A system can include a host device that includes a downstream port and an endpoint device that includes an upstream port. A bidirectional multilane link can interconnect the downstream port and the upstream port. The downstream port can send a request to the upstream port across the bidirectional multilane link to change a number of active lanes in a first direction on the bidirectional multilane link, the request comprising an indication of a desired link width, receive an acknowledgment from the upstream port to change the number of active lanes on the bidirectional multilane link to the desired link width in the first direction, configure the bidirectional multilane link to operate using the desired link width, and send or receiving data to the upstream port using the desired link width. The change in link width can be asymmetrical (i.e., the upstream link width is different from the downstream link width).

25 Claims, 15 Drawing Sheets

(56) References Cited

U.S. PATENT DOCUMENTS

| | | |
|---|---|---|
| 7,469,311 B1 | 12/2008 | Tsu et al. |
| 7,624,211 B2* | 11/2009 | Eggleston ............ G06F 13/1694 |
| | | 710/66 |
| 7,724,678 B1* | 5/2010 | Johnsen .................. H04L 43/50 |
| | | 370/251 |
| 7,793,030 B2 | 9/2010 | Jenkins et al. |
| 7,809,969 B2 | 10/2010 | Sharma et al. |
| 7,934,032 B1* | 4/2011 | Sardella ............... G06F 13/4022 |
| | | 710/316 |
| 8,627,156 B1 | 1/2014 | Erickson |
| 9,043,526 B2* | 5/2015 | Freking ............... G06F 13/4018 |
| | | 710/307 |
| 9,183,171 B2 | 11/2015 | Iyer et al. |
| 9,229,897 B2 | 1/2016 | Iyer et al. |
| 9,244,872 B2 | 1/2016 | Barbiero et al. |
| 9,355,058 B2 | 5/2016 | Iyer et al. |
| 10,601,425 B2 | 3/2020 | Sharma |
| 10,846,247 B2* | 11/2020 | Das Sharma ....... G06F 13/4063 |
| 2004/0090928 A1* | 5/2004 | Drottar ..................... H04L 1/22 |
| | | 370/310 |
| 2005/0039063 A1* | 2/2005 | Hsu ........................ G06F 1/3203 |
| | | 713/324 |
| 2005/0160212 A1 | 7/2005 | Caruk |
| 2006/0023633 A1* | 2/2006 | Caruk ..................... G06F 1/3203 |
| | | 370/242 |
| 2006/0056400 A1* | 3/2006 | Griggs .................. G06F 13/387 |
| | | 370/360 |
| 2006/0271651 A1* | 11/2006 | Tseng .................... G06F 13/385 |
| | | 709/220 |
| 2007/0094437 A1* | 4/2007 | Jabori .................... G06F 1/206 |
| | | 710/307 |
| 2007/0150762 A1 | 6/2007 | Sharma et al. |
| 2007/0234080 A1 | 10/2007 | Mackey et al. |
| 2008/0231711 A1* | 9/2008 | Glen ....................... G09G 5/006 |
| | | 348/192 |
| 2009/0040373 A1 | 2/2009 | Lo |
| 2011/0106989 A1 | 5/2011 | Solomon et al. |
| 2011/0158261 A1 | 6/2011 | Chen |
| 2011/0202703 A1* | 8/2011 | Bacher ................. G06F 13/4022 |
| | | 710/313 |
| 2011/0222111 A1 | 9/2011 | Shima |
| 2011/0246798 A1* | 10/2011 | Bilgin ..................... H04L 12/12 |
| | | 709/202 |
| 2012/0005512 A1 | 1/2012 | Chew |
| 2012/0079156 A1 | 3/2012 | Safranek et al. |
| 2012/0082463 A1 | 4/2012 | Kasprzyk |
| 2012/0191921 A1 | 7/2012 | Shaeffer et al. |
| 2013/0077701 A1* | 3/2013 | Tsien ..................... G06F 1/3253 |
| | | 375/259 |
| 2013/0159761 A1* | 6/2013 | Baumgartner ............ H04L 1/22 |
| | | 710/316 |
| 2014/0006674 A1 | 1/2014 | Chan et al. |
| 2014/0006675 A1 | 1/2014 | Meir |
| 2014/0114887 A1 | 4/2014 | Iyer et al. |
| 2014/0115207 A1 | 4/2014 | Iyer et al. |
| 2014/0195833 A1 | 7/2014 | Wang et al. |
| 2014/0237142 A1* | 8/2014 | Jaussi ................. H04L 41/0896 |
| | | 710/12 |
| 2015/0092791 A1 | 4/2015 | Cornett et al. |
| 2015/0324268 A1* | 11/2015 | Du ....................... G06F 11/3027 |
| | | 714/43 |
| 2016/0041604 A1 | 2/2016 | Choi et al. |
| 2016/0147705 A1 | 5/2016 | Arroyo et al. |
| 2016/0179427 A1 | 6/2016 | Jen et al. |
| 2016/0179647 A1 | 6/2016 | Sharma et al. |
| 2016/0179730 A1 | 6/2016 | Halleck et al. |
| 2016/0182154 A1 | 6/2016 | Fang et al. |
| 2016/0216758 A1 | 7/2016 | Kachare et al. |
| 2016/0283112 A1 | 9/2016 | Blankenship |
| 2016/0283375 A1 | 9/2016 | Sharma et al. |
| 2016/0377679 A1 | 12/2016 | Froelich et al. |
| 2017/0063449 A1* | 3/2017 | Dreps .................. H04B 10/038 |
| 2017/0116090 A1 | 4/2017 | Arroyo et al. |
| 2017/0163286 A1 | 6/2017 | Wu et al. |
| 2017/0351640 A1 | 12/2017 | Nilange et al. |
| 2017/0371831 A1 | 12/2017 | Sharma |
| 2018/0253398 A1* | 9/2018 | Wu ............................ G06F 9/28 |
| 2018/0285227 A1* | 10/2018 | Sharma ................ G06F 11/3041 |
| 2019/0041898 A1 | 2/2019 | Harriman et al. |
| 2019/0042524 A1 | 2/2019 | Sharma |
| 2019/0131974 A1 | 5/2019 | Sharma |
| 2019/0196991 A1* | 6/2019 | Das Sharma ....... G06F 13/4282 |
| 2019/0286605 A1 | 9/2019 | Harriman |
| 2020/0287548 A1 | 9/2020 | Sharma |
| 2021/0105180 A1* | 4/2021 | Ferrer Florit ........... H04L 69/14 |

OTHER PUBLICATIONS

USPTO; Final Office Action issued in U.S. Appl. No. 16/826,001, dated Mar. 31, 2021; 29 pages.

EPO; Extended European Search Report issued in EP Patent Application No. 20155557.0, dated May 25, 2020; 11 pages.

USPTO; Non-Final Office Action issued in U.S. Appl. No. 16/219,883, dated Jul. 22, 2019; 30 pages.

USPTO; Non-Final Office Action issued in U.S. Appl. No. 16/293,269, dated Jan. 24, 2020; 15 pages.

USPTO; Non-Final Office Action issued in U.S. Appl. No. 16/826,001, dated Nov. 6, 2020; 25 pages.

USPTO; Notice of Allowance issued in U.S. Appl. No. 16/219,883, dated Nov. 7, 2019; 10 pages.

USPTO; Notice of Allowance issued in U.S. Appl. No. 16/293,269, dated Jul. 29, 2020; 5 pages.

USPTO; U.S. Appl. No. 17/076,739, filed Oct. 21, 2020; 67 pages.

Wikipedia, "Pci Express," Published (2019); available online at https://en.wikipedia.org/wiki/PCI_Express.

USPTO; Non-Final Office Action issued in U.S. Appl. No. 17/076,739, dated Oct. 4, 2021; 47 pages.

USPTO; Notice of Allowance issued in U.S. Appl. No. 16/826,001, dated Sep. 22, 2021; 32 pages.

USPTO; Final Office Action issued in U.S. Appl. No. 16/023,739, dated Feb. 22, 2022; 42 pages.

EPO; Extended European Search Report issued in EP Patent Application No. 20217133.6, dated Jun. 10, 2021; 16 pages.

* cited by examiner

| 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| +0 | | | | | | | | +1 | | | | | | | | +2 | | | | | | | | +3 | | | | | | | |
| DLLP Type: Link Mgmt 0010_1000 | | | | | | | | Link Mgmt Type | | | | | | | | Reserved | | | | | | | | DSP | | | | | USP | | |
| | | | | | | | | | | | | | | | | | | | | | | | | L0p.Cmd | | | | Desired Link Width | | | |

Link Mgmt Type [7:0]:
0000_0000b: L0p
Rest: Reserved

L0p.Cmd [19:16]:
0000b: L0p supported query: Symmetric
0001b: L0p supported query: Asymmetric
0010b: L0p Enabled: Symmetric
0011b: L0p Enabled: Asymmetric
0100b: L0p Request for Symmetric Link Width
0101b: L0p Request for Asymmetric Link Width
0110b: L0p Request Ack
0111b: L0p Request Nak
1000b: L0p change from next Block
1001b: Still training on L0p upconfig
1010b: Training on L0p upconfig completed
Rest: Reserved Desired Link Width [31:24]:
{DSP[31:28], USP [27:24]}
Both values same if LW are Symmetric
0001b: x1
0010b: x2
0100b: x4
1000b: x8
0000b: x16
1111b: Unchanged
    (- set to this value on L0p.Cmd =
    0000b, 0001b, 0010b, 0011b);
Rest: Reserved (This field reflects the values in the "Desired Link Width" field of the received Request if the L0p.Cmd is 0110b, 0111b, 1000b, and 1010b.)

PARTIAL LINK WIDTH STATES FOR BIDIRECTIONAL MULTILANE LINKS

CROSS REFERENCE TO RELATED APPLICATION

Pursuant to 35 U.S.C. § 119(e), this disclosure claims the benefit of U.S. Provisional Patent Application Ser. No. 62/941,277, titled, "Power Savings Through Asymmetric Partial Link Width States for Computer Buses," filed on Nov. 27, 2019, the entire contents of which are incorporated by reference herein.

BACKGROUND

Interconnects can be used to provide communication between different devices within a system, some type of interconnect mechanism is used. One typical communication protocol for communications interconnects between devices in a computer system is a Peripheral Component Interconnect Express (PCI Express™ (PCIe™)) communication protocol. This communication protocol is one example of a load/store input/output (I/O) interconnect system. The communication between the devices is typically performed serially according to this protocol at very high speeds.

Devices can be connected across various numbers of data links, each data link including a plurality of data lanes. Upstream devices and downstream devices undergo link training upon initialization to optimize data transmissions across the various links and lanes.

BRIEF DESCRIPTION OF THE DRAWINGS

FIG. 4 is a diagram of a link management data link layer packet (DLLP) illustrating example encoding for facilitating partial link widths in one or more directions of a bidirectional link in accordance with embodiments of the present disclosure.

DETAILED DESCRIPTION

Figure 1:
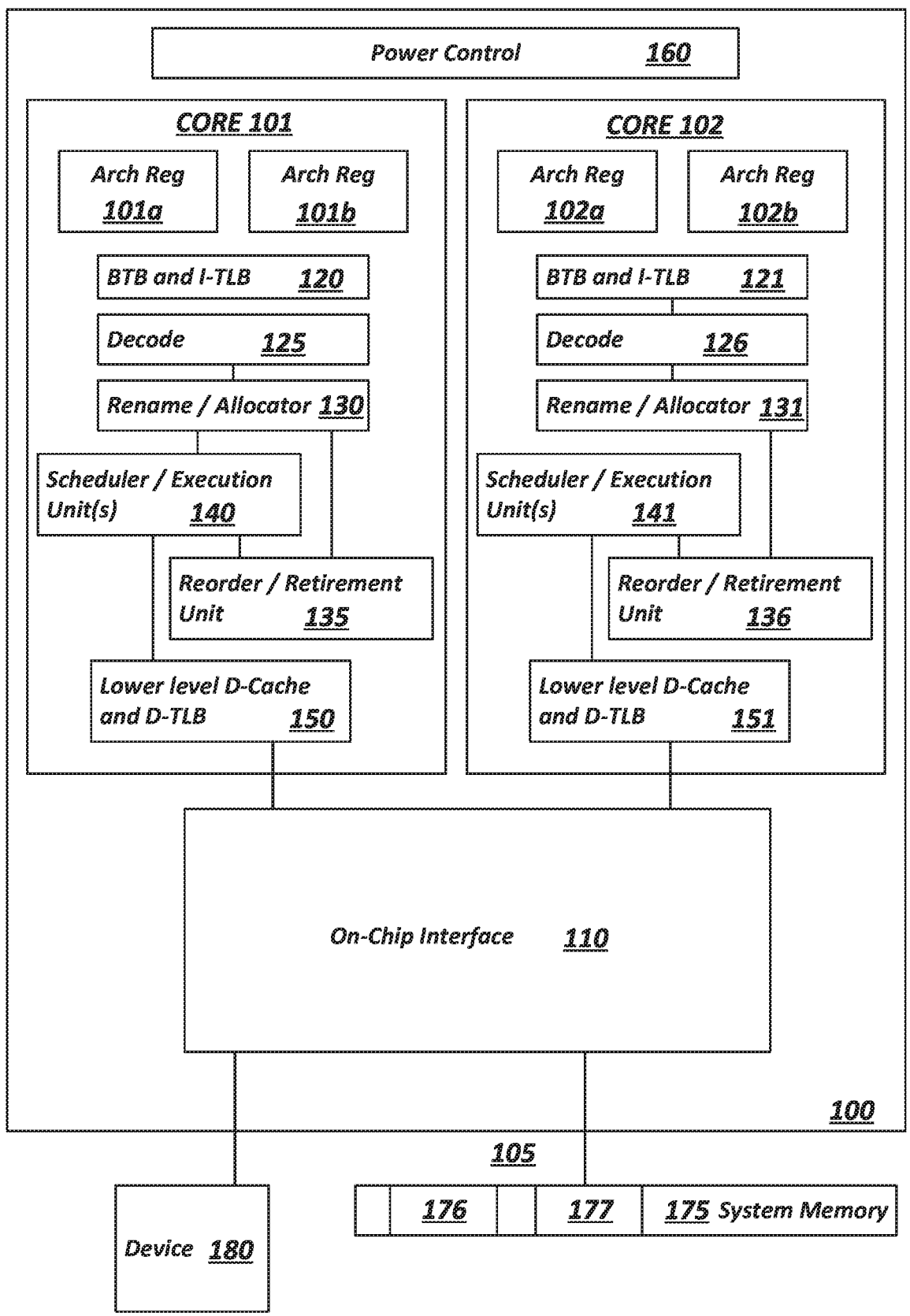
FIG. 1 illustrates an embodiment of a block diagram for a computing system including a multicore processor in accordance with embodiments of the present disclosure.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present disclosure.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the disclosure described herein.

Referring to FIG. 1, an embodiment of a block diagram for a computing system including a multicore processor is depicted. Processor 100 includes any processor or processing device, such as a microprocessor, an embedded processor, a digital signal processor (DSP), a network processor, a handheld processor, an application processor, a co-processor, a system on a chip (SOC), or other device to execute code. Processor 100, in one embodiment, includes at least two cores—core 101 and 102, which may include asymmetric cores or symmetric cores (the illustrated embodiment). However, processor 100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores—core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such as a binary translation, may be utilized to schedule or execute code on one or both cores. Yet to further the discussion, the functional units illustrated in core 101 are described in further detail below, as the units in core 102 operate in a similar manner in the depicted embodiment.

As depicted, core 101 includes two hardware threads 101a and 101b, which may also be referred to as hardware thread slots 101a and 101b. Therefore, software entities, such as an operating system, in one embodiment potentially view processor 100 as four separate processors, i.e., four logical processors or processing elements capable of executing four software threads concurrently. As alluded to above, a first thread is associated with architecture state registers 101a, a second thread is associated with architecture state registers 101b, a third thread may be associated with architecture state registers 102a, and a fourth thread may be associated with architecture state registers 102b. Here, each of the architecture state registers (101a, 101b, 102a, and 102b) may be referred to as processing elements, thread slots, or thread units, as described above. As illustrated, architecture state registers 101a are replicated in architecture state registers 101b, so individual architecture states/contexts are capable of being stored for logical processor 101a and logical processor 101b. In core 101, other smaller resources, such as instruction pointers and renaming logic in allocator and renamer block 130 may also be replicated for threads 101a and 101b. Some resources, such as re-order buffers in reorder/retirement unit 135, ILTB 120, load/store buffers, and queues may be shared through partitioning. Other resources, such as general purpose internal registers, page-table base register(s), low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101a, 101b, respectively. Usually core 101 is associated with a first ISA, which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 126, in one embodiment, recognize the same ISA (or a subset thereof). Alternatively, in a heterogeneous core environment, decoders 126 recognize a second ISA (either a subset of the first ISA or a distinct ISA).

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache, such as a second level cache associated with on-chip interface 110. Note that higher-level or further-out refers to cache levels increasing or getting further way from the execution unit(s). In one embodiment, higher-level cache is a last-level data cache—last cache in the memory hierarchy on processor 100—such as a second or third level data cache. However, higher level cache is not so limited, as it may be associated with or includes an instruction cache. A trace cache—a type of instruction cache—instead may be coupled after decoder 125 to store recently decoded traces. Here, an instruction potentially refers to a macro-instruction (i.e. a general instruction recognized by the decoders), which may decode into a number of micro-instructions (micro-operations).

In the depicted configuration, processor 100 also includes on-chip interface module 110. Historically, a memory controller, which is described in more detail below, has been included in a computing system external to processor 100. In this scenario, on-chip interface 110 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 175 may be dedicated to processor 100 or shared with other devices in a system. Common examples of types of memory 175 include DRAM, SRAM, non-volatile memory (NV memory), and other known storage devices. Note that device 180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 100. For example, in one embodiment, a memory controller hub is on the same package and/or die with processor 100. Here, a portion of the core (an on-core portion) 110 includes one or more controller(s) for interfacing with other devices such as memory 175 or a graphics device 180. The configuration including an interconnect and controllers for interfacing with such devices is often referred to as an on-core (or un-core configuration). As an example, on-chip interface 110 includes a ring interconnect for on-chip communication and a high-speed serial point-to-point link 105 for off-chip communication. Yet, in the SOC environment, even more devices, such as the network interface, co-processors, memory 175, graphics processor 180, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

In some implementations of an interconnect link, the average I/O link utilization can often be less than 50%, even for the thermal design power usage cases. Dynamic link width (DLW) adjustment (also known as link width up configure/down configure) can take the link from L0 state to Recovery to Configuration to L0. This transition between active and inactive states can take several micro-seconds (typically in high single digit to low double-digits), rendering the link is unavailable for exchanging transactions during the inactive states. This latency represents orders of magnitude of increase in latency compared to when the link is in L0 state.

This disclosure describes systems, apparatuses, and methods to allow the link to be partially active and allows transactions to proceed while some other lanes are performing the electrical idle entry (link width down configure) or exit (link width up configure). Furthermore, the techniques and mechanisms described herein support asymmetric link width, enabling power savings when the bandwidth demand is asymmetric (e.g., more inbound vs outbound traffic in storage applications). Thus, the link delivers better power-efficient performance without any of the traditional Quality of Service (QoS) issues due to increased latency in the DLW mechanism causing users not to take advantage of power savings.

In some embodiments, the techniques and mechanisms described herein keep the link active during link reconfiguration. link reconfiguration can mean increasing link width (link up-configuration or up-config) or decreasing link width (link down-configuration or down-config), as well as the link training and scheduling that facilitates the reconfiguration of the link width. Even during link up-config, there is no interruption to the contemporaneous link traffic as the up-configured lanes seamlessly merge with the active lanes based on the scheduling mechanisms and messaging exchanged between link partners.

In addition, the link reconfiguration mechanisms do not stall traffic during the transition to/from the low power link states, which facilitates aggressive deployment. The partial link width state facilitates the ability to dynamically allocate power to other entities (e.g., cores) by taking power away from the I/O usage for reduced bandwidth (or matching the real consumption bandwidth).

Figure 2B:
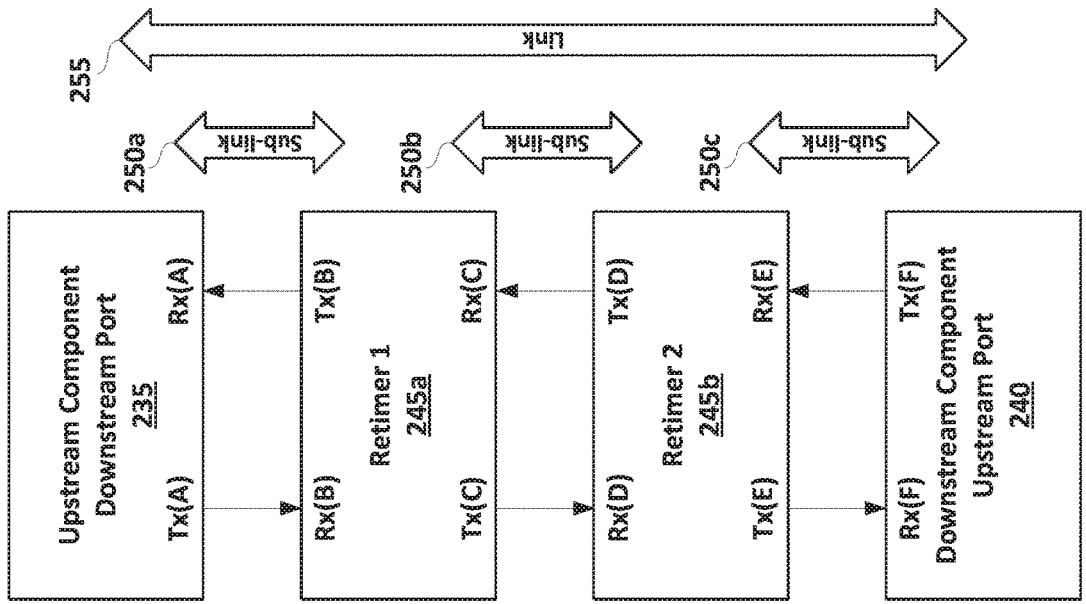
FIGS. 2A-2B are simplified block diagrams of example links that include one or more retimers in accordance with embodiments of the present disclosure.
Figure 2A:
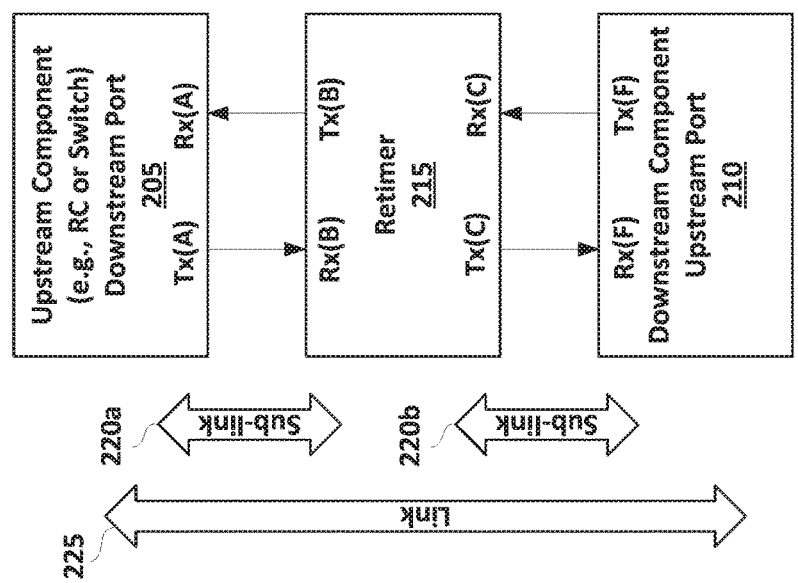

This disclosure describes a mechanism for power savings in multilane, serial interconnects such as PCIe or Compute Express link (CXL) (as shown in FIGS. 2A-B below), which enables the power consumption to be proportionate to bandwidth consumption, without causing link down time. This disclosure describes a mechanism for power savings in serial interconnects such as PCIe or CXL, which enables the power consumption to be proportionate to bandwidth consumption, without causing link down time.

FIGS. 2A-2B are simplified block diagrams of example links that include one or more retimers in accordance with embodiments of the present disclosure. A link incorporating one or more retimers can form two or more separate electrical sub-links at data rates comparable to data rates realized by links employing similar protocols but with no retimers. For instance, a link including a single retimer can form a link with two separate sub-links, each operating at 8.0 GT/s or higher. FIGS. 2A-2B illustrate simplified block diagrams 200a-b of example links including one or more retimers. For instance, in FIG. 2A, a link 225 connecting a first component 205 (e.g., an upstream component, such as a host device, CPU, root complex, port switch, etc.) to a second component 210 (e.g., a downstream component, such as an I/O device, peripheral device, networking card, storage device, accelerator, etc.) can include a single retimer 215a. A first sublink 220a can connect the first component 205 to the retimer 215a and a second sublink 220b can connect the retimer 215a to the second component.

In some implementations, a link, such as a PCIe-compliant link, can include one or more retimers or other extension devices, such as a repeater. A retimer device (or simply "retimer"), can include active electronic devices that receive and re-transmit (retime) digital I/O signals. Retimers can be used to extend the length of a channel that can be used with a digital I/O bus. Retimers can be protocol aware, software transparent, and capable of executing a link equalization procedure, such as the link equalization procedure of PCIe.

As shown in FIG. 2B, multiple retimers 245a, 245b can be utilized to extend a link 255. Three sublinks 250a-c can be defined through the two retimers 245a, 245b, with a first sublink 255a connecting the first component 235 to the first retimer 245a, a second sublink 250b connecting the first retimer 245a to the second retimer 245b, and the third sublink 255c connecting the second retimer 245b to the second component 240.

A primary function of a retimer (buffer) device is signal re-timing. These functions are performed by re-timer circuitry blocks 506 (one block for each direction), as shown. The particular retimer device circuits will depend on the PHY being used for the link. Generally, retimer circuitry is configured to recover the incoming signal and retransmit using a local clock and new transmit equalization circuitry, and may typically employ well-known circuitry for this purpose, such as phase lock loops. A retimer may further comprise transmitter and receiver circuitry including one or more amplifier circuits, as well as various types of well-known signal-conditioning circuitry used to increase the drive level of a received signal. Such retimer circuitry is well-known to those skilled in the high-speed interconnect arts, and, accordingly, no further details are shown or discussed herein.

Each retimer 215, 245a, 245b can have an upstream path and a downstream path. In some implementations, a retimer can include two pseudo ports, and the pseudo ports can determine their respective downstream/upstream orientation dynamically. Further, retimers 215, 245a, 245b can support operating modes including a forwarding mode and an executing mode. Retimers 215, 245a, 245b in some instances can decode data received on the sub-link and re-encode the data that it is to forward downstream on its other sublink. As such, retimers may capture the received bit stream prior to regenerating and re-transmitting the bit stream to another device or even another retimer (or redriver or repeater). In some cases, the retimer can modify some values in the data it receives, such as when processing and forwarding ordered set data. Additionally, a retimer can potentially support any width option as its maximum width, such as a set of width options defined by a specification such as PCIe.

As data rates of serial interconnects (e.g., PCIe, UPI, USB, etc.) increase, retimers are increasingly used to extend the channel reach. Multiple retimers can be cascaded for even longer channel reach. It is expected that as signal speeds increase, channel reach will typically decrease as a general matter. Accordingly, as interconnect technologies accelerate, the use of retimers may become more common. As an example, as PCIe Gen-4, with its 16 GT/s, is adopted in favor of PCIe Gen-3 (8 GT/s), the use of retimers in PCIe interconnects may increase, as may be the case in other interconnects as speeds increase.

In one implementation, a common BGA (Ball Grid Array) footprint may be defined for PCI Express Gen-4 (16 GT/s) based retimers. Such a design may address at least some of the example shortcomings found in conventional PCIe Gen-3 (8 GT/s) retimer devices, as well as some of the issues emerging with the adoption of PCIe Gen-4. Further, for PCIe Gen-4, the number of retimer vendors and volume are expected to increase. Due to signal losses from the doubled data rate (from 8 GT/s to 16 GT/s), the interconnect length achievable is significantly decreased in Gen-4. In this and other example interconnect technologies, as data rate increases, retimers may thereby have increased utility as they can be used to dramatically increase channel lengths that would be otherwise constrained by the increased data rate.

Although shown to be separate from the upstream component and downstream component, the retimer can be part of the upstream or downstream components, on board with the upstream or downstream components, or on package with the downstream component.

An upstream component 205 and downstream component 210 can be connected directly, in some instances, with no retimers, redrivers, or repeaters disposed on the link between the two components 205, 210. In other instances, a retimer (e.g., 215) can be provided to extend the link connecting upstream component 205 and downstream component 210, such as illustrated in FIG. 2A. In still other implementations, two or more retimers (e.g., 245a, 245b) can be provided in series to further extend a link connecting upstream component 235 and downstream component 240. For instance, a particular interconnect technology or protocol may specify a maximum channel length and one or more retimers (e.g., 245a, 245b), can be provided to extend the physical length of the channel connecting two devices 235 and 240. For instance, providing retimers 245a, 245b between upstream component 235 and downstream component 240 can allow a link three times the maximum length specified for a link without these retimers e.g., 245a, 245b, among other example implementations.

In embodiments, the mechanism for power savings can be implemented in serial interconnects such as PCIe, which enables the power consumption to be proportionate to bandwidth consumption, without causing link down time. FIGS. 2A-B show typical PCIe based systems that can implemented the mechanisms described herein. The Downstream Port (DSP) of an Upstream Component 205 or 235 (e.g., a CPU), connects to the Upstream Port (USP) of a Downstream Component 210 or 240 (e.g., networking card, storage, or accelerator), and in some implementations, through one or more retimers 215, 245a, 245b. The USP and the DSP control the link width, and the retimers follow the lead of the USP or DSP. The retimers are configured to understand the tokens that are exchanged and understand how the lanes are changing.

Figure 3:
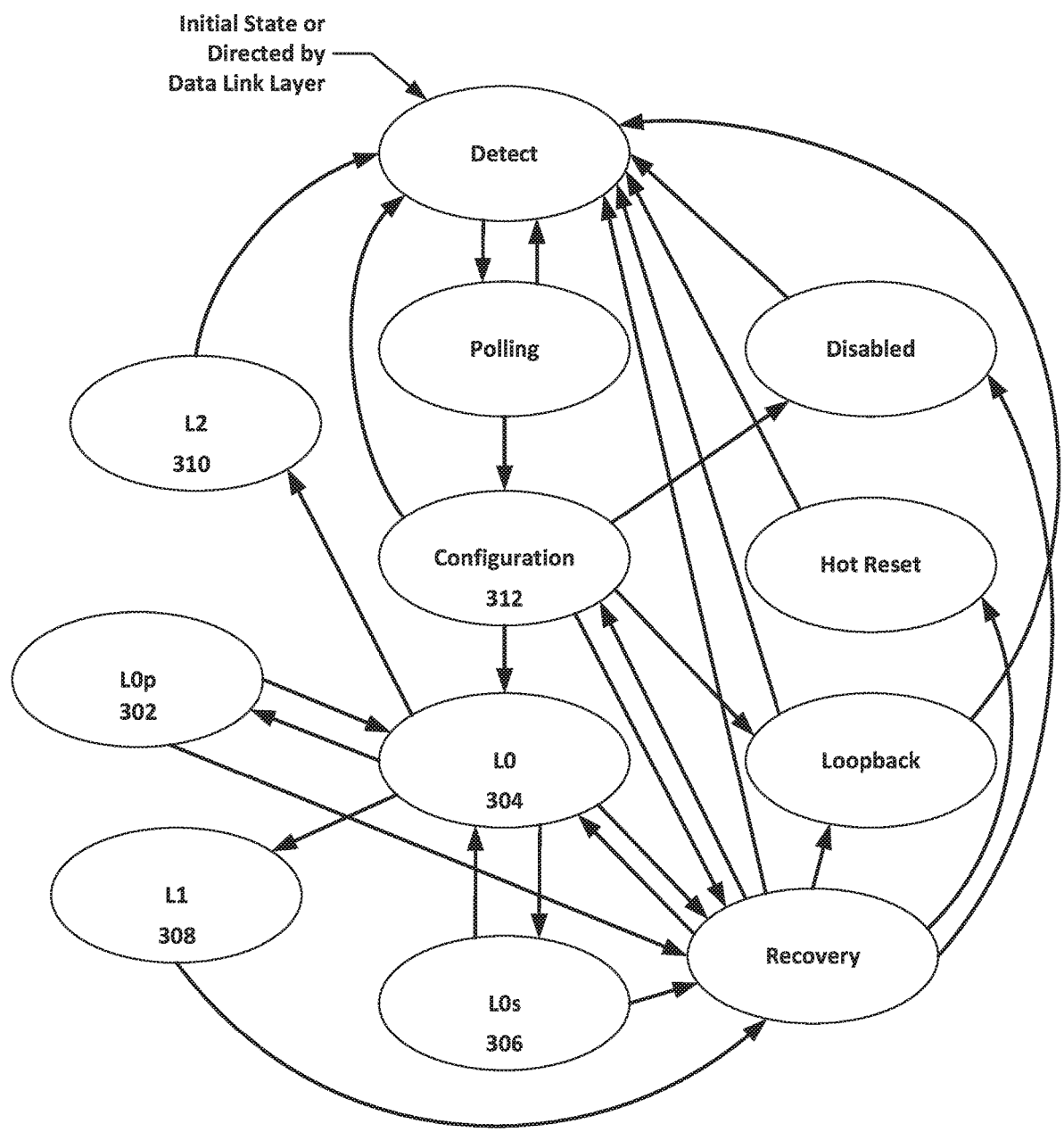
FIG. 3 is a schematic diagram illustrating an example link training state machine that includes a partial L0 (PL0) state in accordance with embodiments of the present disclosure.

Turning to the diagram 300 of FIG. 3, an example link training state machine is shown, such as the PCIe link training and status state machine (LTSSM). FIG. 3 is a schematic diagram illustrating an example link training state machine 300 that includes a partial L0 (PL0) state in accordance with embodiments of the present disclosure. For a system utilizing a PHY according to a particular protocol to support multiple alternative protocols (i.e., to run on top of the PHY), ordered sets may be defined that are to be communicated between two or more devices on a link in connection with the training of the link. For instance, training set (TS) ordered sets (OSes) may be sent. In an implementation utilizing PCIe as the PHY protocol, the TS ordered sets may include a TS1 and a TS2 ordered set, among other example ordered sets. The ordered sets and training sequences sent during link training may be based on the particular link training state, with various link training states utilized to accomplish corresponding link training activities and objectives.

link training state machine 300 can illustrate a link training and state status machine (LTSSM) representative of various states of a multilane link, such as that based on the PCIe protocol. In one example, such as illustrated in FIG. 3, a link training state machine 300 may include such states as a Reset state, a Detect state (e.g., to detect a far end termination (e.g., another device connected to the lanes), a Polling state (e.g., to establish symbol lock and configure lane polarity), a Configuration (or "Config") state (e.g., to configure the physical lanes of a connection into a link with particular lane width, lane numbering, etc., performing lane-to-lane deskew and other link configuration activities), a Loopback state (e.g., to perform testing, fault isolation, equalization, and other tasks), a Recovery state (e.g., for use to change the data rate of operation, re-establish bit lock, Symbol lock or block alignment, perform lane-to-lane deskew, etc.) among other states, which may be utilized to bring the link to an active link state (e.g., L0 304). The LTSSM 300 also illustrates various power states: fully active state (L0 304), electrical idle or standby state (L0s 306), L1 (lower power standby/slumber state 308), L2 (low power sleep state 310), and L3 (link Off state). The LTSSM 300 also illustrates the partial L0 (PL0) state 302, which is the sub-state described herein.

In one example, training sequences to be sent in a particular one (or more) of the link training states may be defined to accommodate the negotiation of a particular one of the supported protocols of a particular device. For instance, the particular training state may be a training state preceding entry into an active link state, or a training state in which the data rate may be upscaled (e.g., beyond that supported by at least one of the supported protocols), such as a PCIe state where a data rate transitions from a Gen1 speed to Gen3 and higher speeds, among other examples. For instance, in the example implementation shown in FIG. 3, a configuration state (e.g., 312) may be utilized and augmented to allow negotiation of a particular one of multiple protocols in parallel with the link training activities defined natively in the training state (e.g., lane width determination, lane numbering, deskew, equalization, etc.). For instance, particular training sequences may be defined for the training state and these training sequences may be augmented to allow information to be communicated (e.g., in one or more fields or symbols of the ordered set) to identify whether each device on the link supports multiple protocols (e.g., at least one protocol stack other than the protocol stack of the physical layer and the corresponding link training state machine), identify the particular protocols each device supports, and agree upon one or more protocols to employ over the particular PHY (e.g., through a handshake accomplished through the transmission of these training sequences across the link (in both the upstream and downstream directions)).

In one example, a PCIe physical layer may be utilized to support multiple different protocols. Accordingly, a particular training state in a PCIe LTSSM may be utilized for the negotiation of protocols between devices on a link. As noted above, the protocol determination may occur even before the link trains to an active state (e.g., L0 304) in the lowest supported data rate (e.g., the PCIe Gen 1 data rate). In one example, the PCIe Config state may be used. Indeed, the PCIe LTSSM may be used to negotiate the protocol by using modified PCIe Training Sets (e.g., TS1 and TS2) after the link width negotiation and (at least partially) in parallel with lane numbering performed during the Config state.

In order to support the link width adjustment mechanisms described herein, the LTSSM is augmented with a state referred to herein as L0p 302, as shown in FIG. 3. Entry to the L0p state 302 occurs from L0 when one Port intends to operate the link at a narrower width than the maximum configured link width negotiated at L0 in either direction. While in this new state, the link continues to operate the same way as in L0, but on a narrower width in at least one direction, while the remaining lanes are in the electrical idle (EI), similar to L1 308. If there are PLL(s) (Phase Locked Loop) associated only with the lanes that are in EI, they can be turned off too. More lanes may be added to EI while in L0p 302 and some of the lanes that are in EI can be turned on also. If the link operates at the maximum configured link width in both directions, the LTSSM enters the state L0 304. If a link up-configuration effort times out in L0p, the link enters Recovery, which will eventually turn on all the lanes. Anytime the link enters Recovery, all the configured lanes of the link (in either direction) will be retrained and the link will enter L0 state 304 in its fully configured width.

As an example, a bidirectional multilane link can include 16 lanes. At some point, 4 lanes (0-3) can be active, while 12 lanes are in a low power or sleep mode. If the system wants to bring up 4 additional lanes, 4 trains are retrained. Then, when there's a break in lanes 0-3, all 8 lanes are sent packet or token to get all 8 lanes to behave the same way. The 8 lanes can be down configured as well to return to 4 lanes.

FIG. 4 is a diagram of a link management data link layer packet (DLLP) illustrating example encoding for facilitating partial link widths in one or more directions of a bidirectional link in accordance with embodiments of the present disclosure. Link width down-configure from L0 or L0p can be negotiated through a DLLP, as shown in FIG. 4. For 8b/10b and 128b/130b encoding, DLLPs are sent periodically as a separate packet. For PCIe 6.0, DLLPs are part of each flit, and hence sent more frequently. The proposed mechanism works for all encodings. A special Link Management DLLP is defined, which includes all L0p related commands. L0p.Cmd defines various L0p command as well as the corresponding responses, including the capability of the component (whether it supports L0p and whether it supports the general asymmetric L0p or a symmetric L0p version, where both directions will attempt to be of the same width). A component may Ack or Nak an L0p request. There are two encodings provided for width in either direction (USP, DSP). A Port may request an L0p in either direction.

Figure 5A:
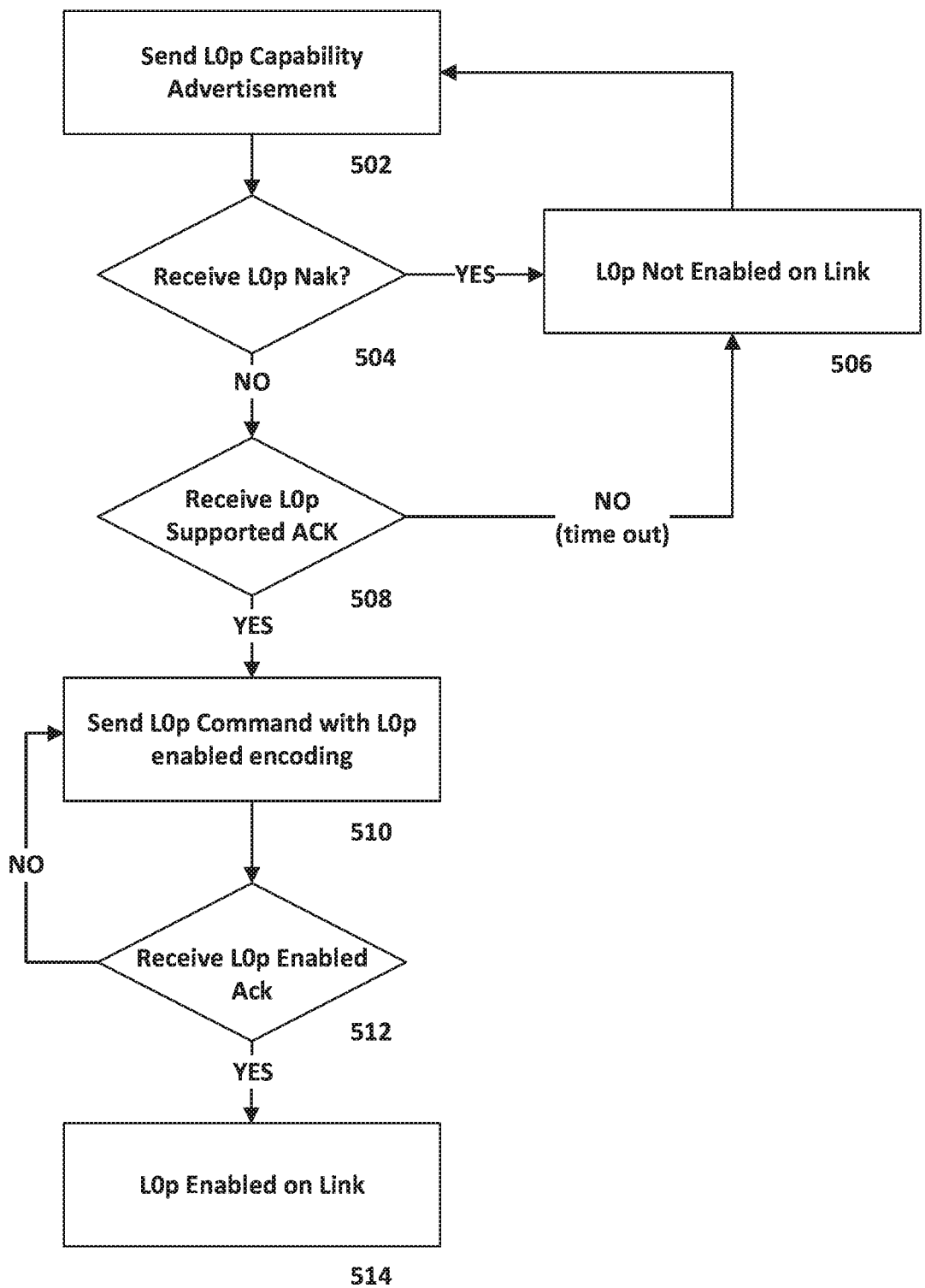
FIGS. 5A-5B are process flow diagrams for negotiation of partial link width state capabilities between two link partners.
Figure 5B:
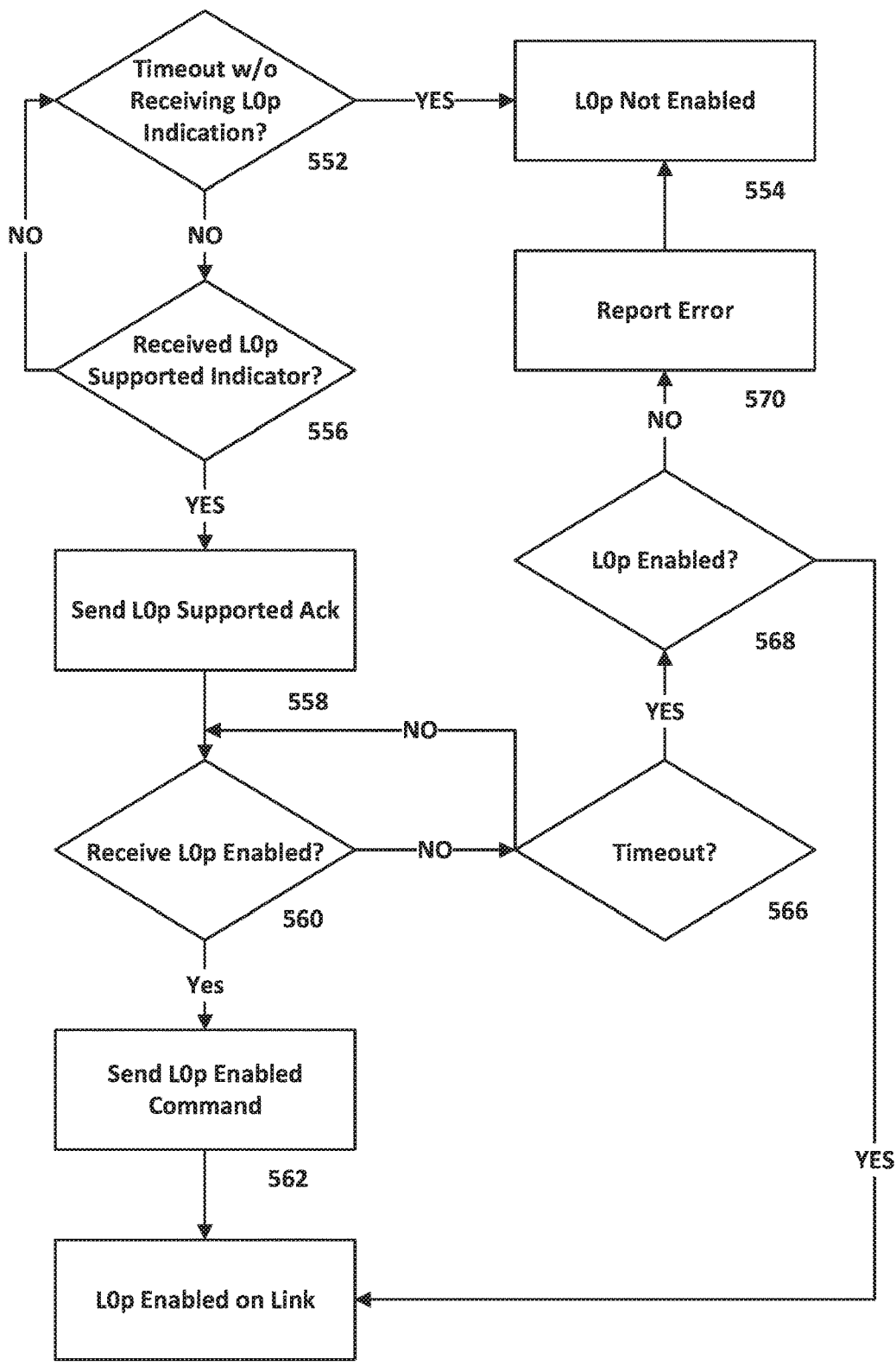

FIGS. 5A-5B are process flow diagrams for negotiation of partial link width state capabilities between two link partners. FIGS. 5A-5B demonstrate how the L0p capability is negotiated between two ports interconnected by a bidirectional multilane link, such as a link that uses a PCIe protocol. FIG. 5A is a process flow diagram 500 for L0p state negotiation between two link partners. A first link partner, such as a downstream port (DSP) of an upstream connected device or an upstream port (USP) of a downstream connected device, can advertise to a second link partner a capability to operate in the L0p state by sending its L0p supported query, which effectively advertises its capability for symmetric and/or asymmetric partial link widths. (502). The advertisement by the first link partner can be performed once during link initialization, or can be performed periodically. The first link partner can periodically check with the second link partner whether to activate the L0p state capability. For example, the DSP or USP may not wish to enable the L0p capability immediately for various reasons, but may want to well after link initialization, or after an event that occurs. The first link partner can send a link management data link layer packet (e.g., an L0p.Cmd DLLP) with an L0p Supported encoding, as well as an indication of whether symmetric or asymmetric (or both) features are capable. In some embodiments, a link partner that indicates a capability to operate using asymmetric partial link widths implies that the link partner can operate using symmetric partial link widths also. Therefore, the DLLP can advertise a symmetric only capability or an asymmetric capability, the latter indicating the capability of both symmetric and asymmetric operation.

After receiving the L0p query from the first link partner, the second link partner can respond with an L0p Request Nak if the second link partner does not (or does not want to) support L0p. (504). If an L0p Nak is received by the first link partner, then L0p is not enabled on the link. (506). The L0p Nak can be a DLLP with an L0p Nak encoding.

If the first link partner does not receive an Ack/Nak after a predetermined amount of time, a time-out can prompt the first link partner to consider that the second link partner does not wish to enable L0p state. The first link partner can then resend a L0p capability advertisement later, periodically. (508)

If the second link partner supports the L0p state, the second link partner can respond to the DSP's L0p Request advertisement with an L0p Request Ack, which can be encoded in a link management DLLP (e.g., an L0p.Cmd DLLP) with an L0p Supported encoding. (508). That is, if the first link partner receives a DLLP with L0p Supported encoding from the second link partner, then the first link partner can consider that an acknowledgment of the L0p Request. The L0p Supported encoding can also advertise to the first link partner whether the second link partner supports symmetric or asymmetric partial link width operation.

If both the first and second link partners support L0p, the first link partner sends a DLLP with an L0p Enabled encoding to the second link partner. (510). More specifically, the first link partner can send a DLLP with an L0p Enabled: Symmetric if at least one side has symmetric-only support for L0p; or DSP can send a DLLP with an L0p Enabled: Asymmetric if both sides support asymmetric L0p.

The second link partner can send back to the first link partner an identical DLLP (e.g., L0p Enabled: (A)symmetric for every L0p Enabled: (A)symmetric DLLP; etc.) the second link partner receives. (512). (The term (A)symmetric is used here for shorthand to mean either Asymmetric or Symmetric). In some embodiments, the second link partner sends back at most one identical L0p Enabled encoded DLLP for each one the second link partner receives. When the first link partner receives a DLLP with an L0p Enabled: (A)symmetric encoding from the second link partner, the initialization process is completed and L0p is enabled in the Link. (514). If the first link partner does not receive a DLLP with an L0p Enabled encoding, the first link partner can wait or can send another DLLP with L0p Enabled encoding to the second link partner.

Either a DSP or a USP can initiate a partial link width negotiation. In embodiments, if a USP sends an L0p query and receives and L0p query from the DSP, the USP responds with an Ack/Nak; while the DSP will ignore the L0p query received from the USP.

FIG. 5B is a process flow diagram 550 for a partial link width capability negotiation in accordance with embodiments of the present disclosure. Diagram 550 provides an example negotiation flow for enabling partial link widths between two link partners. The link partner that sent the initial DLLP advertising the partial link width capability can be referred to in this example process flow as the initiating link partner; the link partner that responds to the initial advertisement can be referred to in this example as the responding link partner.

During link training or during a predetermined time interval or after a triggering event, a link partner can expect to receive a DLLP with L0p Supported encoding from the initiating link partner. The responding link partner waits a predetermined amount of time for the initial DLLP with L0p Supported encoding (advertisement) from the initiating link partner. (552). If the predetermined amount of time runs out (i.e., a time-out occurs) prior to receiving an L0p Supported request from the initiating link partner, then the partial link width is not enabled. (570).

If the responding link partner does receive an L0p Supported encoded DLLP from the initiating link partner, (556) then the responding partner can send an acknowledgment (Ack) to the initiating link partner. (558). The acknowledgment can be a DLLP with an L0p Supported encoding, specifying symmetric-only or asymmetric partial link width capability. (558). In some embodiments, the responding partner can send a negative acknowledgment (Nak) if the responding partner determines not to enable the partial link width state. The Nak can be a DLLP with an L0p Nak encoding.

The responding partner can wait for a predetermined amount of time to receive an L0p Enabled encoded DLLP. (560). If a time-out occurs prior to receiving the L0p Enable DLLP from the initiating link partner, but both link partners have transmitted Acks, then the responding partner can activate the partial link width capability as a precaution, in case the L0p Enable DLLP was lost by error. (568). The responding partner can report an error message to the initiating link partner, host processor, or other link manager, indicating that the partial link width state negotiation and can indicate that the L0p Enable DLLP was not received. (570). The partial link width state on the link would then be considered not enabled on the link. The initiating link partner can then retry at a later time to enable the partial link width state (e.g., after error handling or at a predetermined time interval or after a triggering event). If after a timeout (566), the partial link width state is already enabled, then the link can remain in the L0p state without taking further action (564).

If the responding link partner receives a DLLP indicating that the L0p state is enabled (560), then the responding link partner can send an acknowledgment to the initiating link partner. (562). The acknowledgment can be a DLLP with a L0p Enable encoding, similar to the DLLP with L0p Enable encoding received by the responding link partner at (560). The L0p state is then considered enabled on the link. (564).

The initiating link partner can be a DSP or a USP; and the responding link partner can be a DSP or a USP.

Figure 6A:
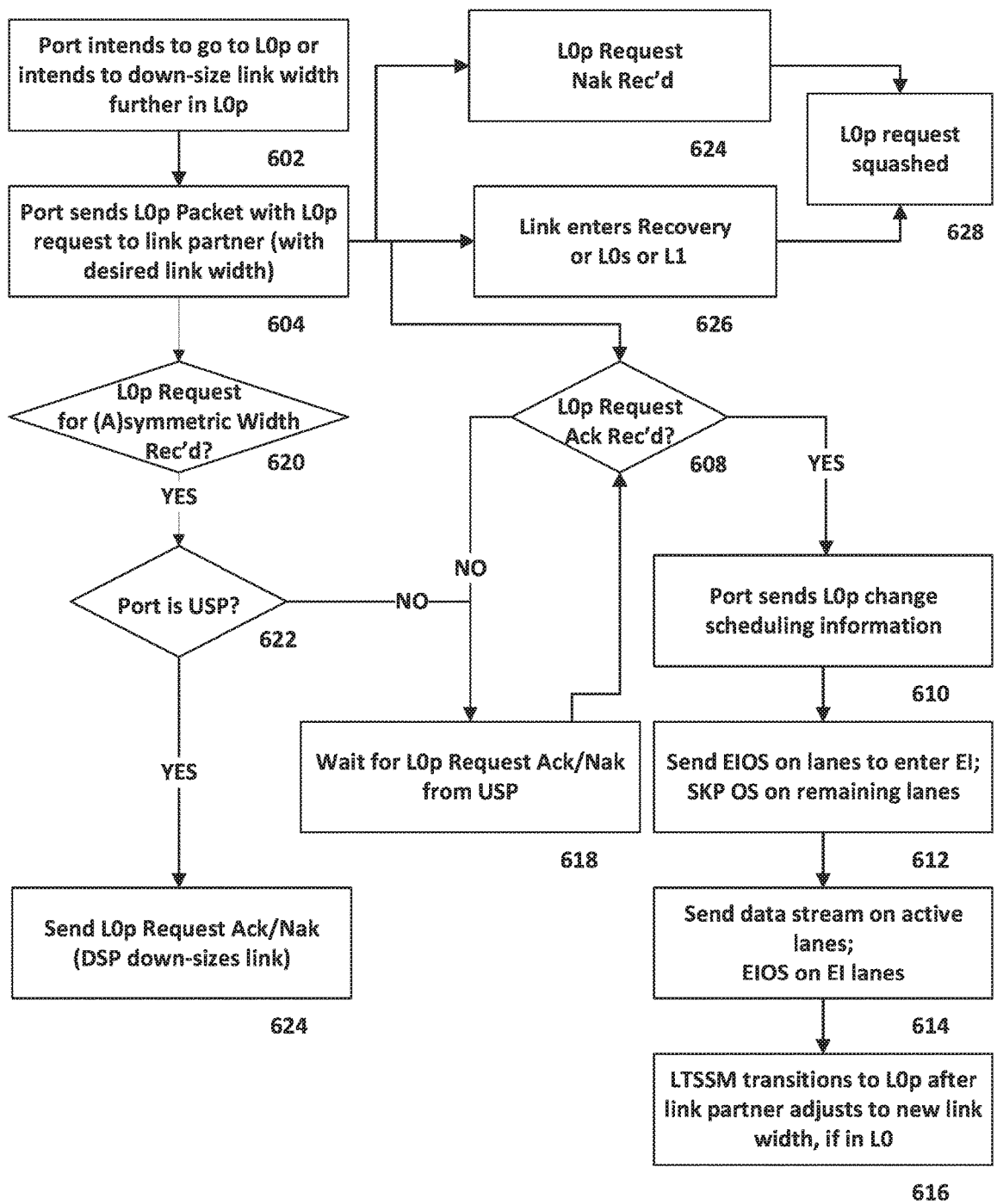
FIG. 6A is a process flow diagram for down-configuring a bidirectional multilane link.
Figure 6B:
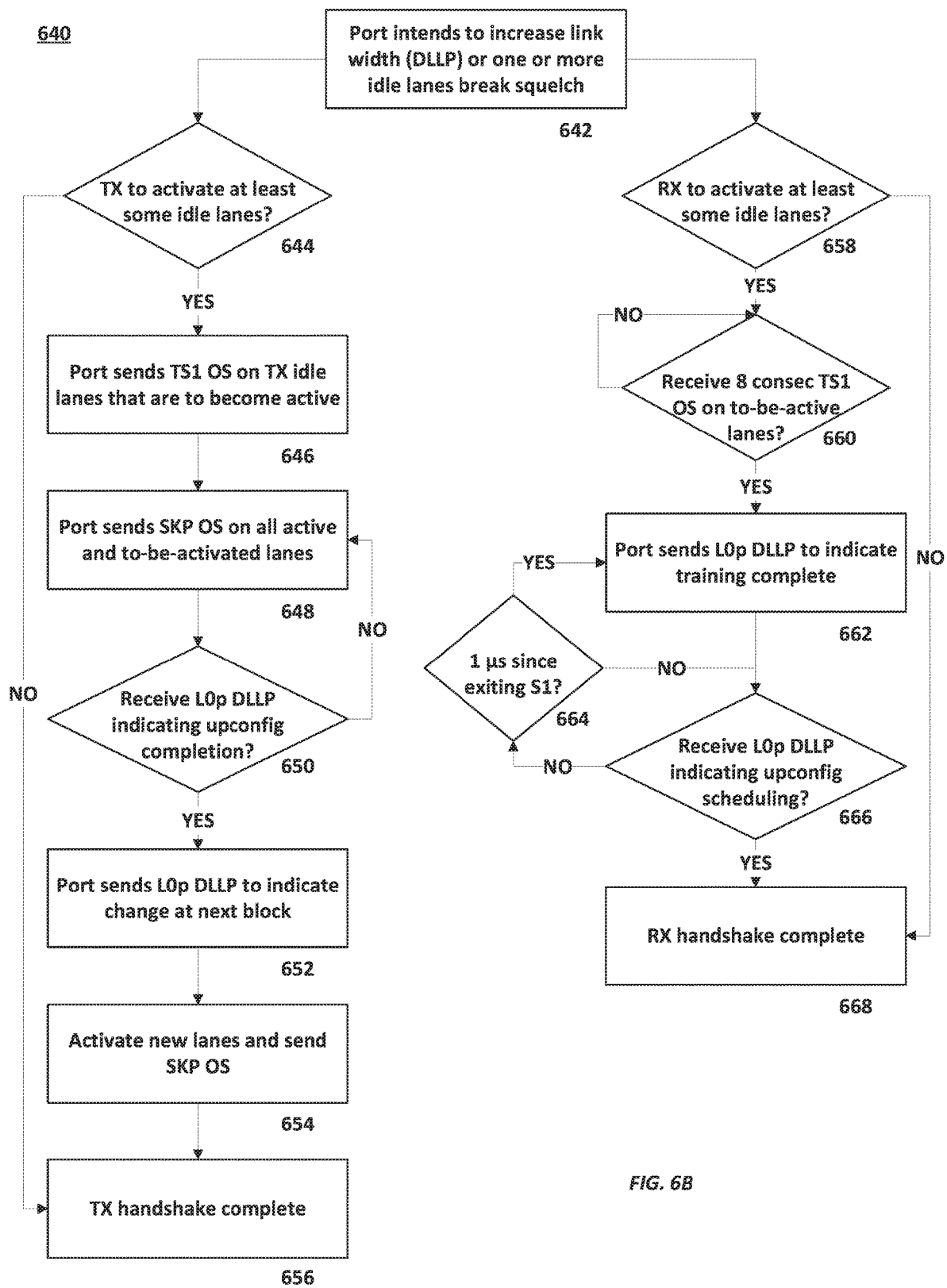
FIG. 6B is a process flow diagram for up-configuring a bidirectional multilane link.
Figure 6C:
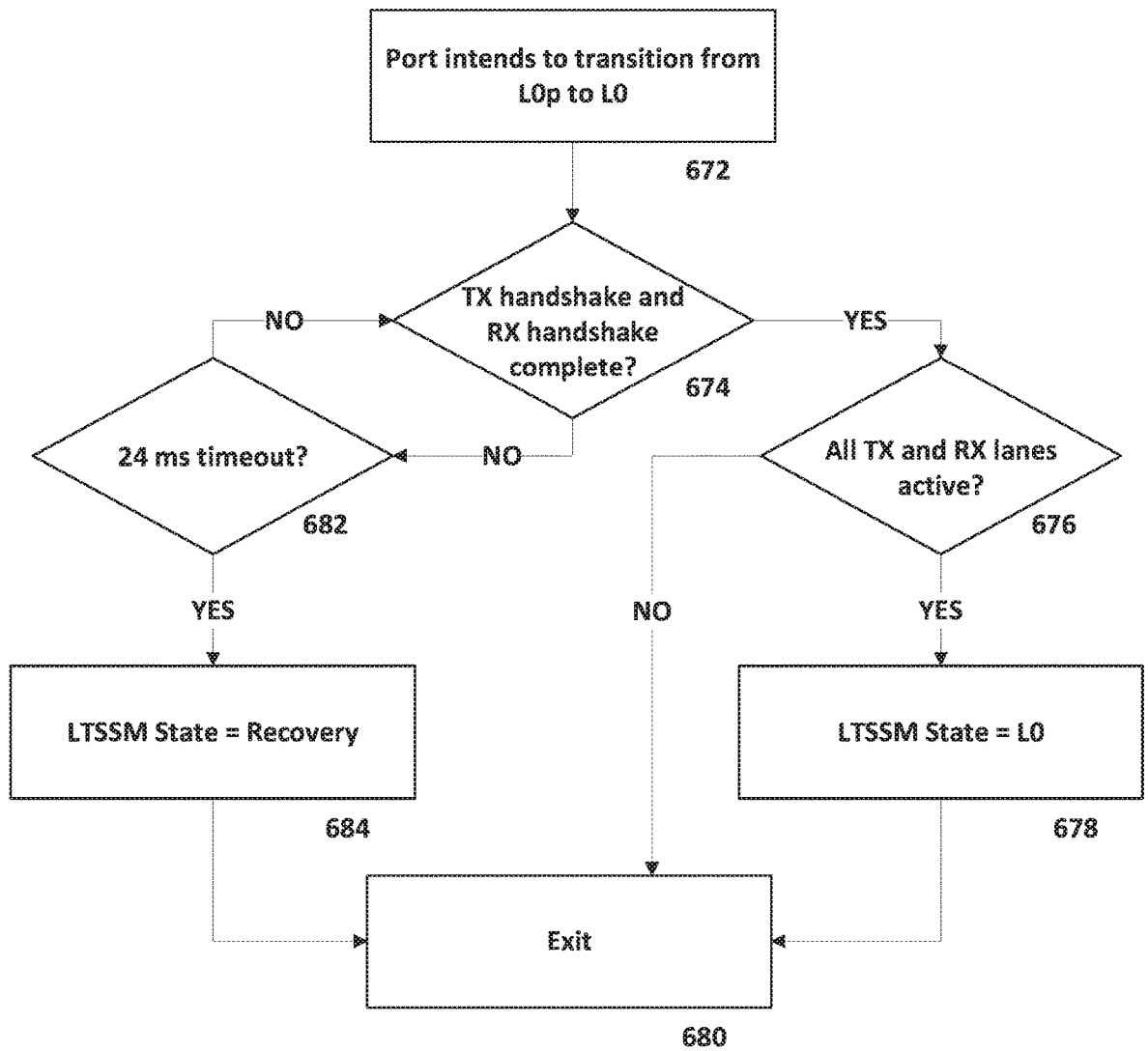
FIG. 6C is a process flow diagram for changing a link state to a partial link width state in accordance with embodiments of the present disclosure.

Following the initial negotiation to enable partial link width state on the link between two link partners, the link partners can then up-configure or down-configure the link. FIGS. 6A-6C are process flow diagrams for how a port can reconfigure the link. FIG. 6A is a process flow diagram 600 for down-configuring a bidirectional multilane link. Process flow diagram 600 is applicable for when a port wants to enter L0p from L0, or for when the port is in L0p, and wants to further down-configure the link. Process flow diagram 600 provide process flows for if the initiating link partner is a DSP or a USP.

At 602, the initiating port determines that it wants to down-configure the link in either direction. An initiating port that intends to down-configure the operational link width in any direction (i.e., a transmission direction or a reception direction) can send a message to a responding port to indicate a desired link width. (604). For example, an initiating port can send to the responding port an L0p Link Management DLLP with L0p.Cmd=L0p Request for (A)symmetric Link width with the desired width(s) in each direction and waits for a response (Ack or Nak).

If an L0p Request Nak response is received (624), the down configuration request has been rejected by the responding port, and the request process ends. (628). The link remains in the current power state or (partial) link width or enters recovery. If a link enters Recovery or a low power state from L0 while the link width down configure request has not completed (626), the entire process is squashed (628). Even when the Link is in L0p state, any transition to Recovery will get the link back to the fully configured width L0 state on exit from Recovery.

If an L0p Request Ack response is received, (612), the link can reconfigure to operating using the reduced link width (610, 612, 614, 616). Each port waits till the next scheduled SKP OS (SKiP Ordered Set). The port sends a message scheduling the change (610). For example, the port can send an L0p Link Management DLLP with an L0p from next Block encoding in a flit of the current Data Stream prior to a scheduled SKP OS. Note that this flit need not be the last flit prior to the SKP OS. The port sends SKP OS on the Lanes that will remain active and Electrical Idle Ordered Set (EIOS) on the Lanes that will go to Electrical Idle (EI). (612). Then, the port can send data on active lanes and EIOS on electrical idle lanes (614). Thus, there is no downtime of the link to down-configure the link width. The LTSSM can transition from L0p if it was in L0 after the link is operating in the new link width. (616).

It is possible that both ports send an L0p Link Management DLLP with L0p.Cmd='L0p Request for (A)symmetric Link width' with the desired width(s) in each direction independently, without having received the Link Partner's request. In that case, the DSP's request wins out and the USP has to respond, while the DSP ignores the USP's request. In FIG. 6A, this condition is illustrated as follows: if an L0p request is received and if the port is the USP, (622) then the USP sends an L0p Request Ack/Nak to defer to the DSP or to squash the request. (624). If the port is a DSP, (622) then the port awaits for the L0p Request Ack/Nak from the USP (618) in response to the original request at (604), and takes action from there by starting to reconfigure the link, wait for a time-out, or squash the request (in response to receiving a Nak).

FIG. 6B is a process flow diagram 640 for up-configuring a bidirectional multilane link. FIG. 6C is a process flow diagram 670 for changing a link state to a partial link width state in accordance with embodiments of the present disclosure. FIGS. 6B and 6C are described together. In FIGS. 6B-6C, the port intends to transition to L0 from L0p, up-configure in L0p, or one or more idle lanes break squelch in L0p. (642). The partial link width up-configuration can be requested by any Link Partner, irrespective of who may have initiated the down configure request(s).

Process flow 640 treats the transmission side differently from the reception side for asymmetric partial link width states. On the TX side: a transmitter side requesting up-configuration does not need to initiate the up-configuration process using a DLLP. The lanes that are to be reactivated go through a Recovery style handshake (waking up the Lanes, acquiring bit lock, Block alignment, stabilizing the Lanes, etc), while the normal traffic flow continues on the active Lanes. For example, the transmitter can send training sequence 1 ordered sets (TS1 OS) on TX idle lanes that are to-become-active and EIEOS every 32 TS1 OS. (646). Active lanes continue to send data blocks during this time. The transmitter can send SKP OS as scheduled on all active and to-become-active lanes, as scheduled. (648). After the transmitter receives an L0p DLLP with an indication that training on L0p up-config is completed (L0p.Cmd=L0p Training on L0p upconfig completed) (650), the port can send a DLLP scheduling the L0p change in the next block (L0p.Cmd="L0p change from next block). (652). The to-be-activated lanes are added to the set of already activated lanes and the port sends SKP OS on all active lanes followed by the data stream (654). Then, the TX handshake is complete (656).

Once the reactivated lanes are ready to be activated and merged with the active Lanes, the Port waits for the SKP OS boundary, sends the scheduled SKP OS on the currently active+to-become-active lanes, followed by a new data stream on the new link width. The expectation is that the Receiver Port (and Pseudo-Port) has already deskewed across all the Lanes by this time (previously active+newly reactivated Lanes). A Pseudo-Port may represent an extension of the retraining on the Lanes with a bit in the SKP OS during the training process. On completion, if the Link is operating at the maximum configured width in both directions, the LTSSM transitions to L0 from L0p state.

On the receiver side: If asymmetric link width is supported, a receiver may request up-configure by sending an L0p Link Management DLLP with L0p.Cmd='L0p Request for (A)symmetric Link width' with the desired width(s) in each direction and waits for an Ack. (658). The receiver can wait to receive a predetermined number of TS1 OS (e.g., 8 consecutive TS1 OS) on lanes that need to become active, and confirmation that the lanes are deskewed with active lanes at the block boundary. (660). The receiver can send an L0p DLLP indicating upconfig training is complete (e.g., L0p.Cmd=Training on L0p upconfig completed) (662). If the receiver receives an L0p DLLP indicating that the L0p change is to be scheduled (e.g., L0p.Cmd=L0p change from next block), then the RX handshake is complete. If not, then the receiver can wait a predetermined amount of time (664) before resending the training complete DLLP (L0p.Cmd=Training on L0p upconfig completed) (662). The predetermined amount of time can be, for example, 1 us since exiting the 51 state.

Figure 7:
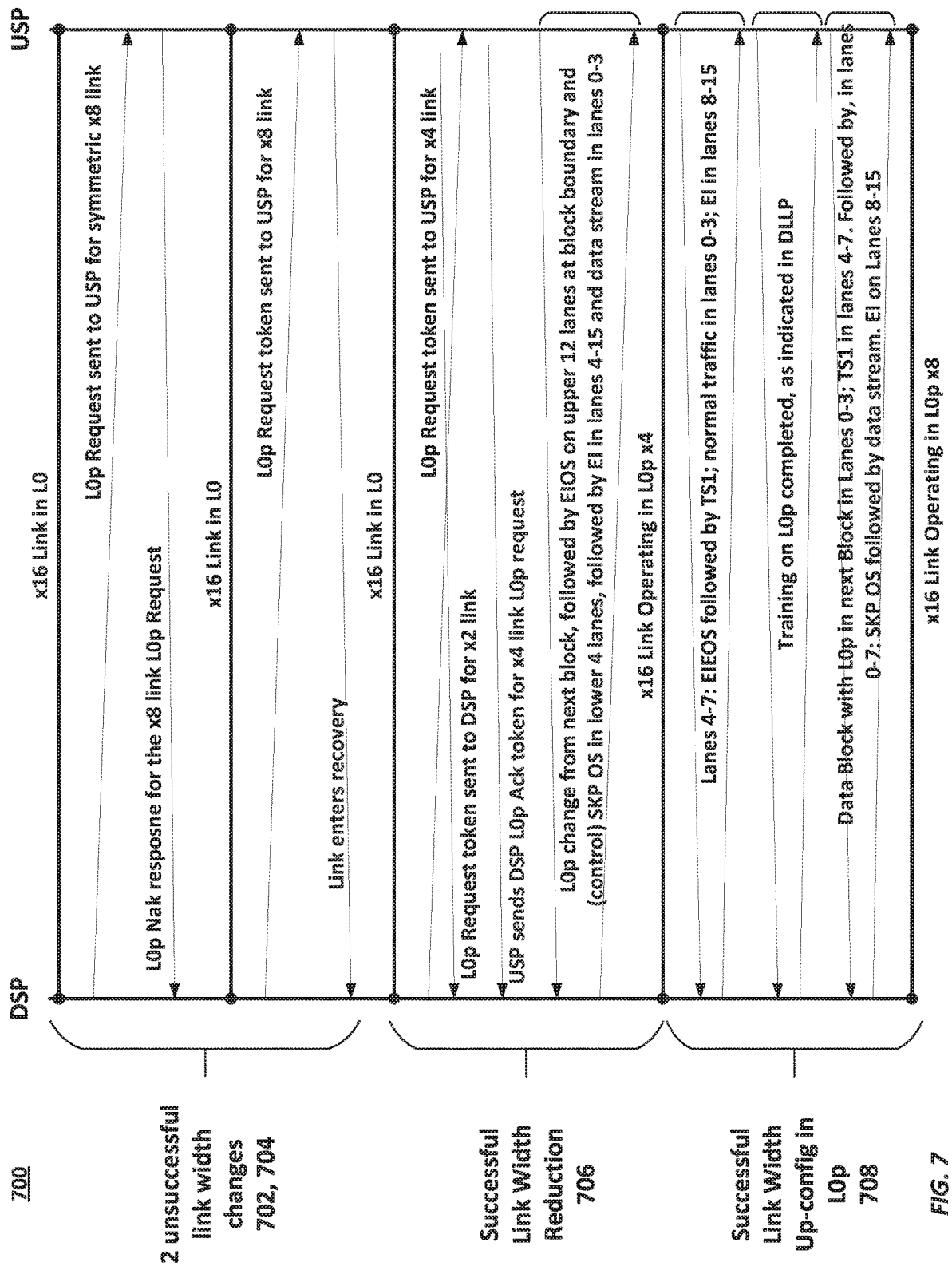
FIG. 7 is a swim lane diagram illustrating various embodiments for negotiating link width reconfigurations in accordance with embodiments of the present disclosure.

In symmetric Link width, either Port can initiate the up-configure process without sending a DLLP. FIG. 7 is a swim lane diagram 700 illustrating various embodiments for negotiating link width reconfigurations in accordance with embodiments of the present disclosure. The first attempt at link width down-configure fails since the link partner Naks the request. The second attempt fails as the link enters Recovery prior to the down-configure completing. The third attempt succeeds: the two sides almost simultaneously make the request. Hence the DSP's request for down-configuring to x4 stands, which the USP Ack's and the link operates at x4 width, while the LTSSM enters L0_L1p state. After that the up-configure request to take the link to a x8, initiated by the USP succeeds and the link ends at a x8 width while still being in the L0_L1p state.

The first two examples 702, 704 illustrate unsuccessful link width adjustments. At the outset, an x16 link with operating in L0. In 702, the DSP sends PL0 request token to the USP to transition from x16 L0 to x8 PL0. The USP responds with a NAK, which ends the request. Likewise, in 704, the DSP sends a PL0 request token to transition from x16 L0 to x8 PL0, but the USP enters recovery, which also terminates the request. If a link enters Recovery or a low power state from L0 while the link width down configure request has not completed, the entire process is squashed.

In 706, both link partners transmit down configure requests. It is possible that both sides send the PL0 Request Token independently, without having received the link Partner's token. Here, the DSP requests a down configure from x16 L0 to x4 PL0, while the USP requests a transition from x16 L0 to x2 PL0. The DSP's request wins out and the USP has to respond (e.g., here USP responds with an ACK), while the DSP ignores the USP's request. The USP and DSP will each transmit PL0 from next block encodings, followed by EIOS on upper 12 lanes, control or SKP OS on lower 4 lanes, EI on lanes 4-15, and data stream on lanes 0-3.

In 708, a port intends on up configuring from x4 PL0 to x8 PL0. Both ports perform the following:

1) EIEOS is transmitted on lanes 4-7, followed by TS1 on lanes 4-7 for link training. Normal traffic is transmitted on lanes 0-3, and EI is transmitted on lanes 8-15 (which are to stay idle).

2) TS2s (with EIEOS) are transmitted on lanes 4-7 to indicate link ready, normal traffic transmitted on lanes 0-3, and EI on lanes 8-15.

3) EDS on lanes 0-3 to signify end of that data stream. TS2 on lanes 4-7, EI on 8-15.

4) SKIP OS, SDS, and data stream on all active lanes 0-7, while continuing EI on 8-15.

Figure 8:
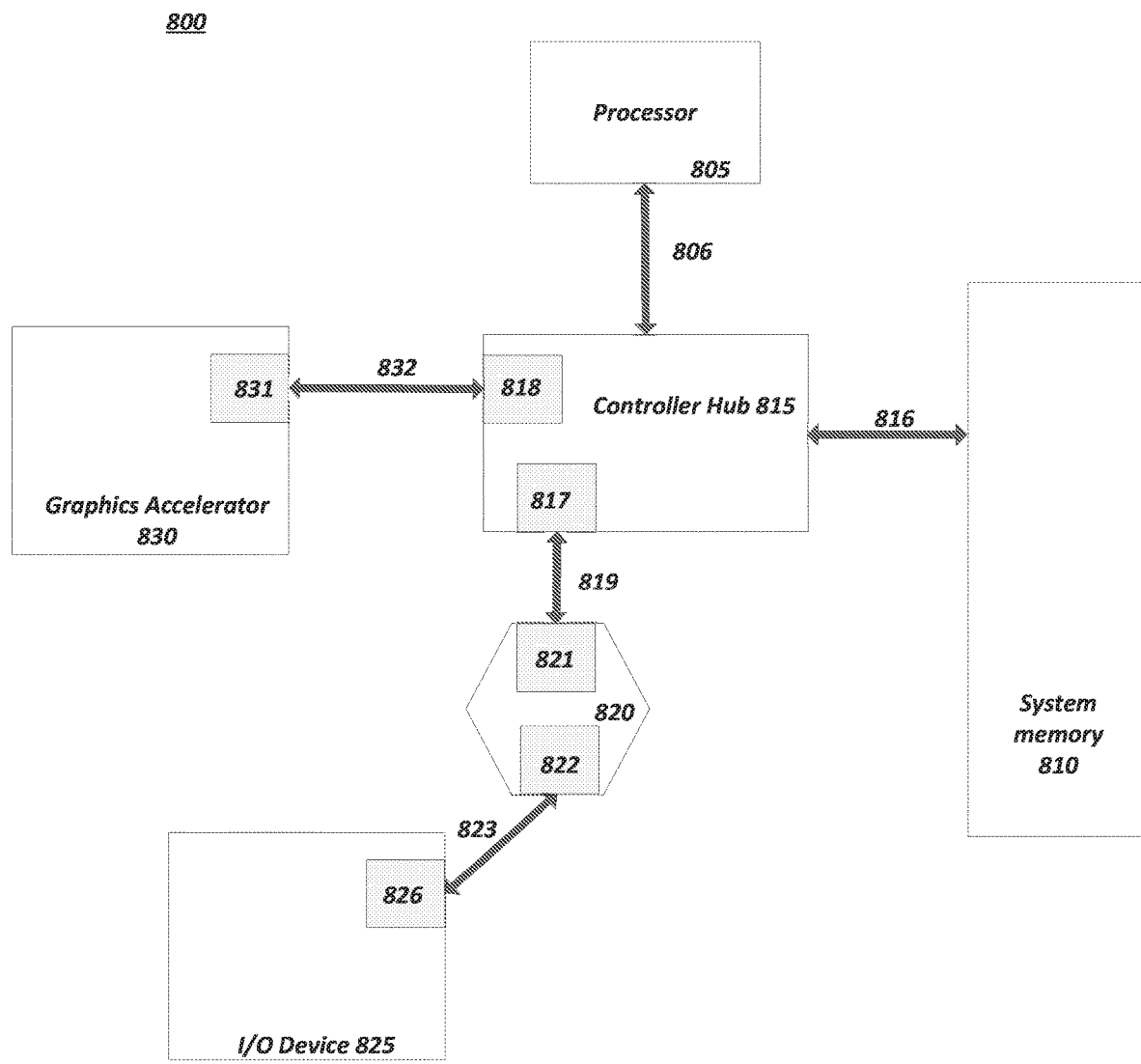
FIG. 8 illustrates an embodiment of a computing system including an interconnect architecture.

Referring to FIG. 8, an embodiment of a fabric composed of point-to-point links that interconnect a set of components is illustrated. System 800 includes processor 805 and system memory 810 coupled to controller hub 815. Processor 805 includes any processing element, such as a microprocessor, a host processor, an embedded processor, a co-processor, or other processor. Processor 805 is coupled to controller hub 815 through front-side bus (FSB) 806. In one embodiment, FSB 806 is a serial point-to-point interconnect as described below. In another embodiment, link 806 includes a serial, differential interconnect architecture that is compliant with different interconnect standard.

System memory 810 includes any memory device, such as random access memory (RAM), non-volatile (NV) memory, or other memory accessible by devices in system 800. System memory 810 is coupled to controller hub 815 through memory interface 816. Examples of a memory interface include a double-data rate (DDR) memory interface, a dual-channel DDR memory interface, and a dynamic RAM (DRAM) memory interface.

In one embodiment, controller hub 815 is a root hub, root complex, or root controller in a Peripheral Component Interconnect Express (PCIe or PCIE) interconnection hierarchy. Examples of controller hub 815 include a chipset, a memory controller hub (MCH), a northbridge, an interconnect controller hub (ICH) a southbridge, and a root port controller/hub. Often the term chipset refers to two physically separate controller hubs, i.e. a memory controller hub (MCH) coupled to an interconnect controller hub (ICH). Note that current systems often include the MCH integrated with processor 805, while controller 815 is to communicate with I/O devices, in a similar manner as described below. In some embodiments, peer-to-peer routing is optionally supported through root complex 815.

Here, controller hub 815 is coupled to switch/bridge 820 through serial link 819. Input/output modules 817 and 821, which may also be referred to as interfaces/ports 817 and 821, include/implement a layered protocol stack to provide communication between controller hub 815 and switch 820. In one embodiment, multiple devices are capable of being coupled to switch 820.

Switch/bridge 820 routes packets/messages from device 825 upstream, i.e. up a hierarchy towards a root complex, to controller hub 815 and downstream, i.e. down a hierarchy away from a root port controller, from processor 805 or system memory 810 to device 825. Switch 820, in one embodiment, is referred to as a logical assembly of multiple virtual PCI-to-PCI bridge devices. Device 825 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 825 may include a PCIe to PCI/PCI-X bridge to support legacy or other version PCI devices. Endpoint devices in PCIe are often classified as legacy, PCIe, or root complex integrated endpoints.

Graphics accelerator 830 is also coupled to controller hub 815 through serial link 832. In one embodiment, graphics accelerator 830 is coupled to an MCH, which is coupled to an ICH. Switch 820, and accordingly I/O device 825, is then coupled to the ICH. I/O modules 831 and 818 are also to implement a layered protocol stack to communicate between graphics accelerator 830 and controller hub 815. Similar to the MCH discussion above, a graphics controller or the graphics accelerator 830 itself may be integrated in processor 805.

Figure 9:
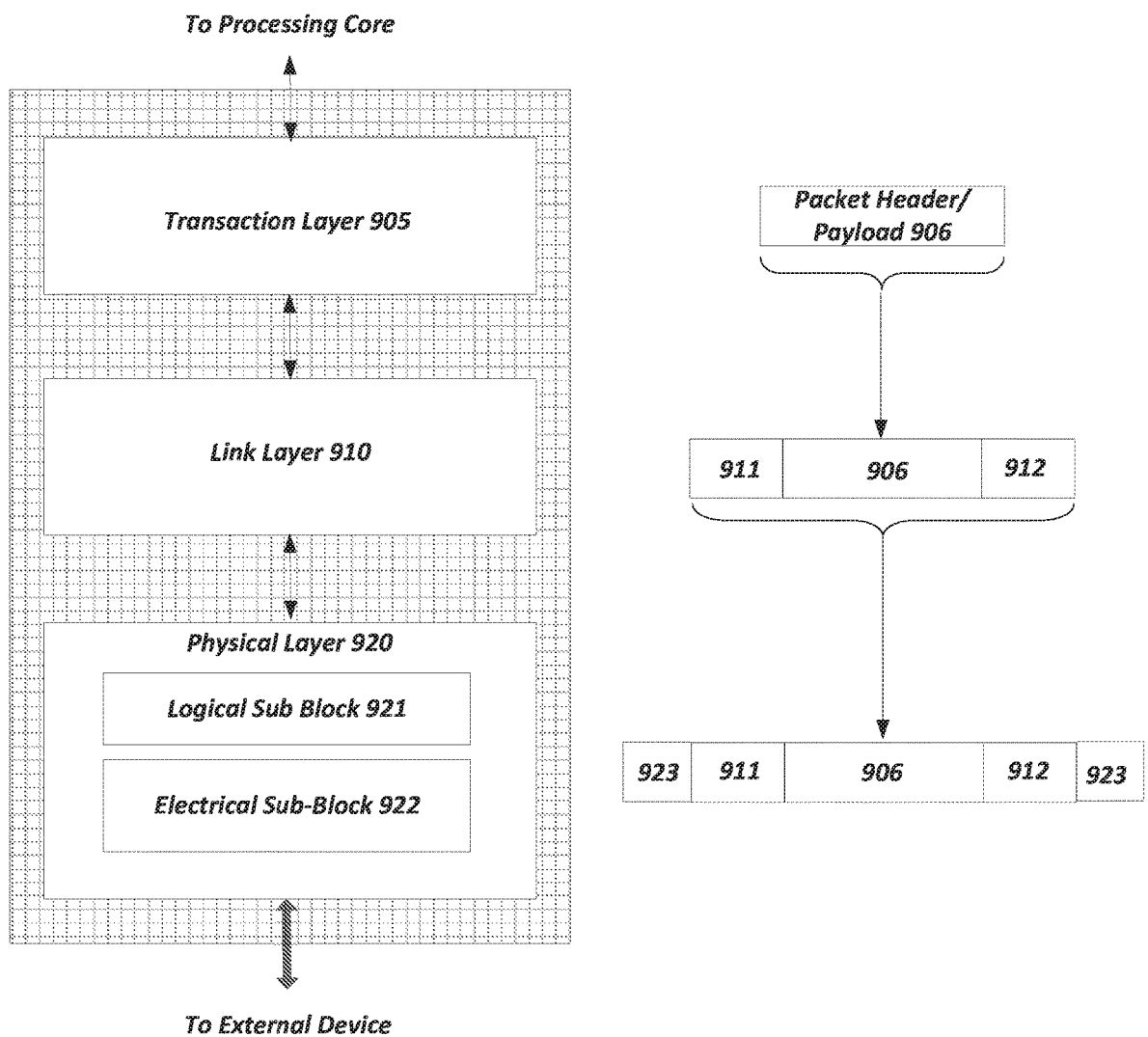
FIG. 9 illustrates an embodiment of an interconnect architecture including a layered stack.

Turning to FIG. 9 an embodiment of a layered protocol stack is illustrated. Layered protocol stack 900 includes any form of a layered communication stack, such as a Quick Path Interconnect (QPI) stack, a PCIe stack, a next generation high performance computing interconnect stack, or other layered stack. Although the discussion immediately below in reference to FIGS. 8-11 are in relation to a PCIe stack, the same concepts may be applied to other interconnect stacks. In one embodiment, protocol stack 900 is a PCIe protocol stack including transaction layer 905, link layer 910, and physical layer 920. An interface, such as interfaces 817, 818, 821, 822, 826, and 831 in FIG. 8, may be represented as communication protocol stack 900. Representation as a communication protocol stack may also be referred to as a module or interface implementing/including a protocol stack.

PCI Express uses packets to communicate information between components. Packets are formed in the Transaction Layer 905 and Data link Layer 910 to carry the information from the transmitting component to the receiving component. As the transmitted packets flow through the other layers, they are extended with additional information necessary to handle packets at those layers. At the receiving side the reverse process occurs, and packets get transformed from their Physical Layer 920 representation to the Data link Layer 910 representation and finally (for Transaction Layer Packets) to the form that can be processed by the Transaction Layer 905 of the receiving device.

Transaction Layer

In one embodiment, transaction layer 905 is to provide an interface between a device's processing core and the interconnect architecture, such as data link layer 910 and physical layer 920. In this regard, a primary responsibility of the transaction layer 905 is the assembly and disassembly of packets (i.e., transaction layer packets, or TLPs). The translation layer 905 typically manages credit-base flow control for TLPs. PCIe implements split transactions, i.e. transactions with request and response separated by time, allowing a link to carry other traffic while the target device gathers data for the response.

In addition, PCIe utilizes credit-based flow control. In this scheme, a device advertises an initial amount of credit for each of the receive buffers in Transaction Layer 905. An external device at the opposite end of the link, such as controller hub 815 in FIG. 8, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 905 assembles packet header/payload 906. Format for current packet headers/payloads may be found in the PCIe specification at the PCIe specification website.

Figure 10:
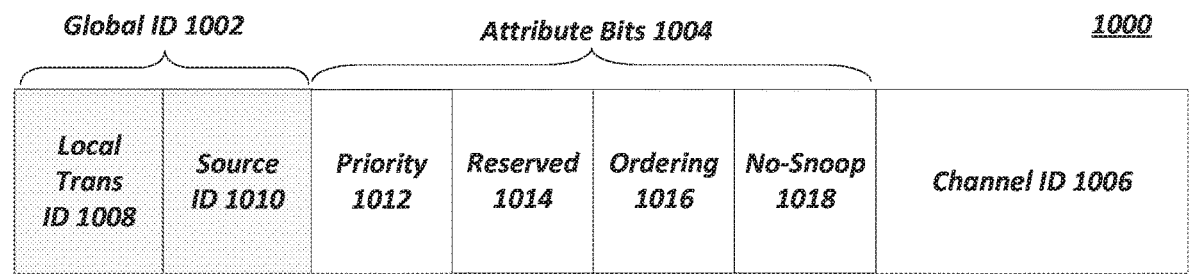
FIG. 10 illustrates an embodiment of a request or packet to be generated or received within an interconnect architecture.

Quickly referring to FIG. 10, an embodiment of a PCIe transaction descriptor is illustrated. In one embodiment, transaction descriptor 1000 is a mechanism for carrying transaction information. In this regard, transaction descriptor 1000 supports identification of transactions in a system. Other potential uses include tracking modifications of default transaction ordering and association of transaction with channels.

Transaction descriptor 1000 includes global identifier field 1002, attributes field 1004, and channel identifier field

1006. In the illustrated example, global identifier field 1002 is depicted comprising local transaction identifier field 1008 and source identifier field 1010. In one embodiment, global transaction identifier 1002 is unique for all outstanding requests.

According to one implementation, local transaction identifier field 1008 is a field generated by a requesting agent, and it is unique for all outstanding requests that require a completion for that requesting agent. Furthermore, in this example, source identifier 1010 uniquely identifies the requestor agent within a PCIe hierarchy. Accordingly, together with source ID 1010, local transaction identifier 1008 field provides global identification of a transaction within a hierarchy domain.

Attributes field 1004 specifies characteristics and relationships of the transaction. In this regard, attributes field 1004 is potentially used to provide additional information that allows modification of the default handling of transactions. In one embodiment, attributes field 1004 includes priority field 1012, reserved field 1014, ordering field 1016, and no-snoop field 1018. Here, priority sub-field 1012 may be modified by an initiator to assign a priority to the transaction. Reserved attribute field 1014 is left reserved for future, or vendor-defined usage. Possible usage models using priority or security attributes may be implemented using the reserved attribute field.

In this example, ordering attribute field 1016 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 1018 is utilized to determine if transactions are snooped. As shown, channel ID Field 1006 identifies a channel that a transaction is associated with.

Link Layer

Link layer 910, also referred to as data link layer 910, acts as an intermediate stage between transaction layer 905 and the physical layer 920. In one embodiment, a responsibility of the data link layer 910 is providing a reliable mechanism for exchanging Transaction Layer Packets (TLPs) between two components a link. One side of the Data link Layer 910 accepts TLPs assembled by the Transaction Layer 905, applies packet sequence identifier 911, i.e. an identification number or packet number, calculates and applies an error detection code, i.e. CRC 912, and submits the modified TLPs to the Physical Layer 920 for transmission across a physical to an external device.

Physical Layer

In one embodiment, physical layer 920 includes logical sub block 921 and electrical sub-block 922 to physically transmit a packet to an external device. Here, logical sub-block 921 is responsible for the "digital" functions of Physical Layer 921. In this regard, the logical sub-block includes a transmit section to prepare outgoing information for transmission by physical sub-block 922, and a receiver section to identify and prepare received information before passing it to the link Layer 910.

Physical block 922 includes a transmitter and a receiver. The transmitter is supplied by logical sub-block 921 with symbols, which the transmitter serializes and transmits onto to an external device. The receiver is supplied with serialized symbols from an external device and transforms the received signals into a bit-stream. The bit-stream is de-serialized and supplied to logical sub-block 921. In one embodiment, an 8b/10b transmission code is employed, where ten-bit symbols are transmitted/received. Here, special symbols are used to frame a packet with frames 923. In addition, in one example, the receiver also provides a symbol clock recovered from the incoming serial stream.

As stated above, although transaction layer 905, link layer 910, and physical layer 920 are discussed in reference to a specific embodiment of a PCIe protocol stack, a layered protocol stack is not so limited. In fact, any layered protocol may be included/implemented. As an example, a port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 11:
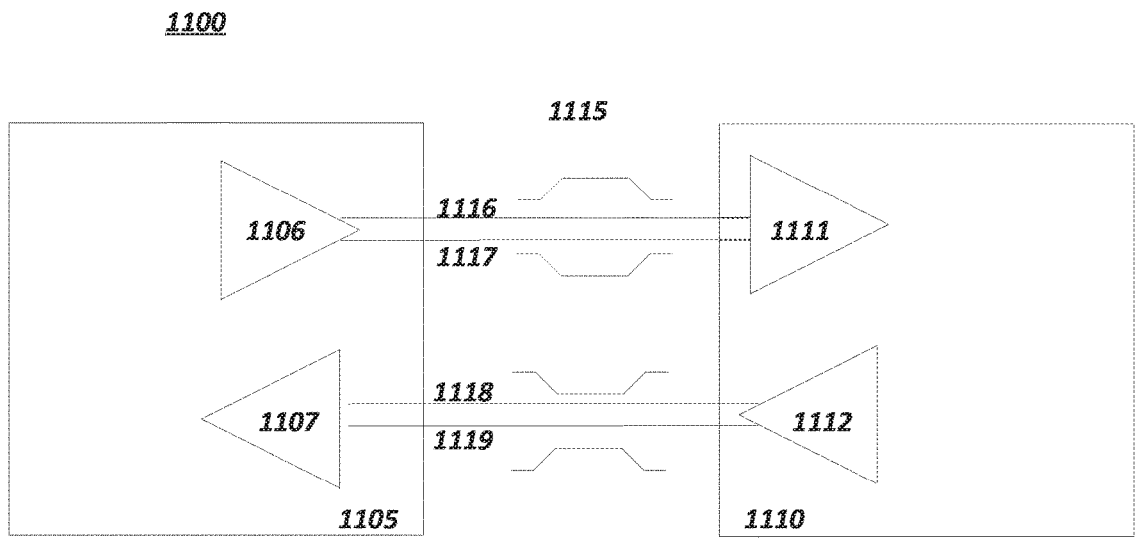
FIG. 11 illustrates an embodiment of a transmitter and receiver pair for an interconnect architecture.

Referring next to FIG. 11, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 1106/1111 and a receive pair 1112/1107. Accordingly, device 1105 includes transmission logic 1106 to transmit data to device 1110 and receiving logic 1107 to receive data from device 1110. In other words, two transmitting paths, i.e. paths 1116 and 1117, and two receiving paths, i.e. paths 1118 and 1119, are included in a PCIe link.

A transmission path refers to any path for transmitting data, such as a transmission line, a copper line, an optical line, a wireless communication channel, an infrared communication link, or other communication path. A connection between two devices, such as device 1105 and device 1110, is referred to as a link, such as link 1115. A link may support one lane—each lane representing a set of differential signal pairs (one pair for transmission, one pair for reception). To scale bandwidth, a link may aggregate multiple lanes denoted by xN, where N is any supported link width, such as 1, 2, 4, 8, 12, 16, 32, 64, or wider.

A differential pair refers to two transmission paths, such as lines 1116 and 1117, to transmit differential signals. As an example, when line 1116 toggles from a low voltage level to a high voltage level, i.e. a rising edge, line 1117 drives from a high voltage level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

Note that the apparatus, methods, and systems described above may be implemented in any electronic device or system as aforementioned. As specific illustrations, the figures below provide exemplary systems for utilizing the disclosure as described herein. As the systems below are described in more detail, a number of different interconnects are disclosed, described, and revisited from the discussion above. And as is readily apparent, the advances described above may be applied to any of those interconnects, fabrics, or architectures.

Figure 12:
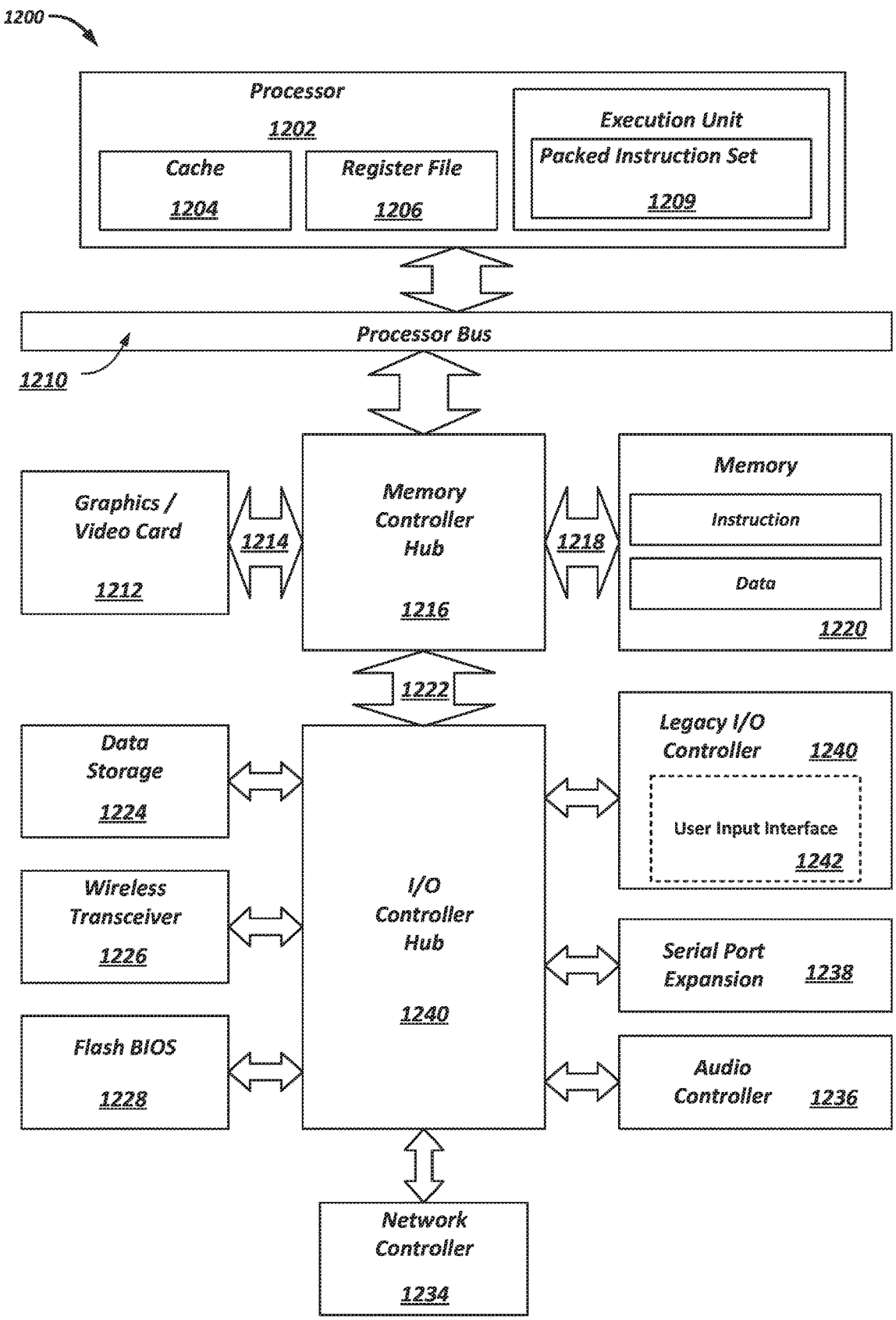
FIG. 12 illustrates another embodiment of a block diagram for a computing system including a processor.

Turning to FIG. 12, a block diagram of an exemplary computer system formed with a processor that includes execution units to execute an instruction, where one or more of the interconnects implement one or more features in accordance with one embodiment of the present disclosure is illustrated. System 1200 includes a component, such as a processor 1202 to employ execution units including logic to perform algorithms for process data, in accordance with the present disclosure, such as in the embodiment described herein. System 1200 is representative of processing systems based on the PENTIUM III™, PENTIUM 4™, Xeon™, Itanium, XScale™ and/or StrongARM™ microprocessors available from Intel Corporation of Santa Clara, California, although other systems (including PCs having other microprocessors, engineering workstations, set-top boxes and the like) may also be used. In one embodiment, sample system 1200 executes a version of the WINDOWS™ operating system available from Microsoft Corporation of Redmond, Washington, although other operating systems (UNIX and Linux for example), embedded software, and/or graphical user interfaces, may also be used. Thus, embodiments of the present disclosure are not limited to any specific combination of hardware circuitry and software.

Embodiments are not limited to computer systems. Alternative embodiments of the present disclosure can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

In this illustrated embodiment, processor 1202 includes one or more execution units 1208 to implement an algorithm that is to perform at least one instruction. One embodiment may be described in the context of a single processor desktop or server system, but alternative embodiments may be included in a multiprocessor system. System 1200 is an example of a 'hub' system architecture. The computer system 1200 includes a processor 1202 to process data signals. The processor 1202, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 1202 is coupled to a processor bus 1210 that transmits data signals between the processor 1202 and other components in the system 1200. The elements of system 1200 (e.g. graphics accelerator 1212, memory controller hub 1216, memory 1220, I/O controller hub 1224, wireless transceiver 1226, Flash BIOS 1228, Network controller 1234, Audio controller 1236, Serial expansion port 1238, I/O controller 1240, etc.) perform their conventional functions that are well known to those familiar with the art.

In one embodiment, the processor 1202 includes a Level 1 (L1) internal cache memory 1204. Depending on the architecture, the processor 1202 may have a single internal cache or multiple levels of internal caches. Other embodiments include a combination of both internal and external caches depending on the particular implementation and needs. Register file 1206 is to store different types of data in various registers including integer registers, floating point registers, vector registers, banked registers, shadow registers, checkpoint registers, status registers, and instruction pointer register.

Execution unit 1208, including logic to perform integer and floating point operations, also resides in the processor 1202. The processor 1202, in one embodiment, includes a microcode (☒code) ROM to store microcode, which when executed, is to perform algorithms for certain macroinstructions or handle complex scenarios. Here, microcode is potentially updateable to handle logic bugs/fixes for processor 1202. For one embodiment, execution unit 1208 includes logic to handle a packed instruction set 1209. By including the packed instruction set 1209 in the instruction set of a general-purpose processor 1202, along with associated circuitry to execute the instructions, the operations used by many multimedia applications may be performed using packed data in a general-purpose processor 1202. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time.

Alternate embodiments of an execution unit 1208 may also be used in micro controllers, embedded processors, graphics devices, DSPs, and other types of logic circuits. System 1200 includes a memory 1220. Memory 1220 includes a dynamic random access memory (DRAM) device, a static random access memory (SRAM) device, flash memory device, or other memory device. Memory 1220 stores instructions and/or data represented by data signals that are to be executed by the processor 1202.

Note that any of the aforementioned features or aspects of the disclosure may be utilized on one or more interconnect illustrated in FIG. 12. For example, an on-die interconnect (ODI), which is not shown, for coupling internal units of processor 1202 implements one or more aspects of the disclosure described above. Or the disclosure is associated with a processor bus 1210 (e.g. Intel Quick Path Interconnect (QPI) or other known high performance computing interconnect), a high bandwidth memory path 1218 to memory 1220, a point-to-point link to graphics accelerator 1212 (e.g. a Peripheral Component Interconnect express (PCIe) compliant fabric), a controller hub interconnect 1222, an I/O or other interconnect (e.g. USB, PCI, PCIe) for coupling the other illustrated components. Some examples of such components include the audio controller 1236, firmware hub (flash BIOS) 1228, wireless transceiver 1226, data storage 1224, legacy I/O controller 1210 containing user input and keyboard interfaces 1242, a serial expansion port 1238 such as Universal Serial Bus (USB), and a network controller 1234. The data storage device 1224 can comprise a hard disk drive, a floppy disk drive, a CD-ROM device, a flash memory device, or other mass storage device.

Figure 13:
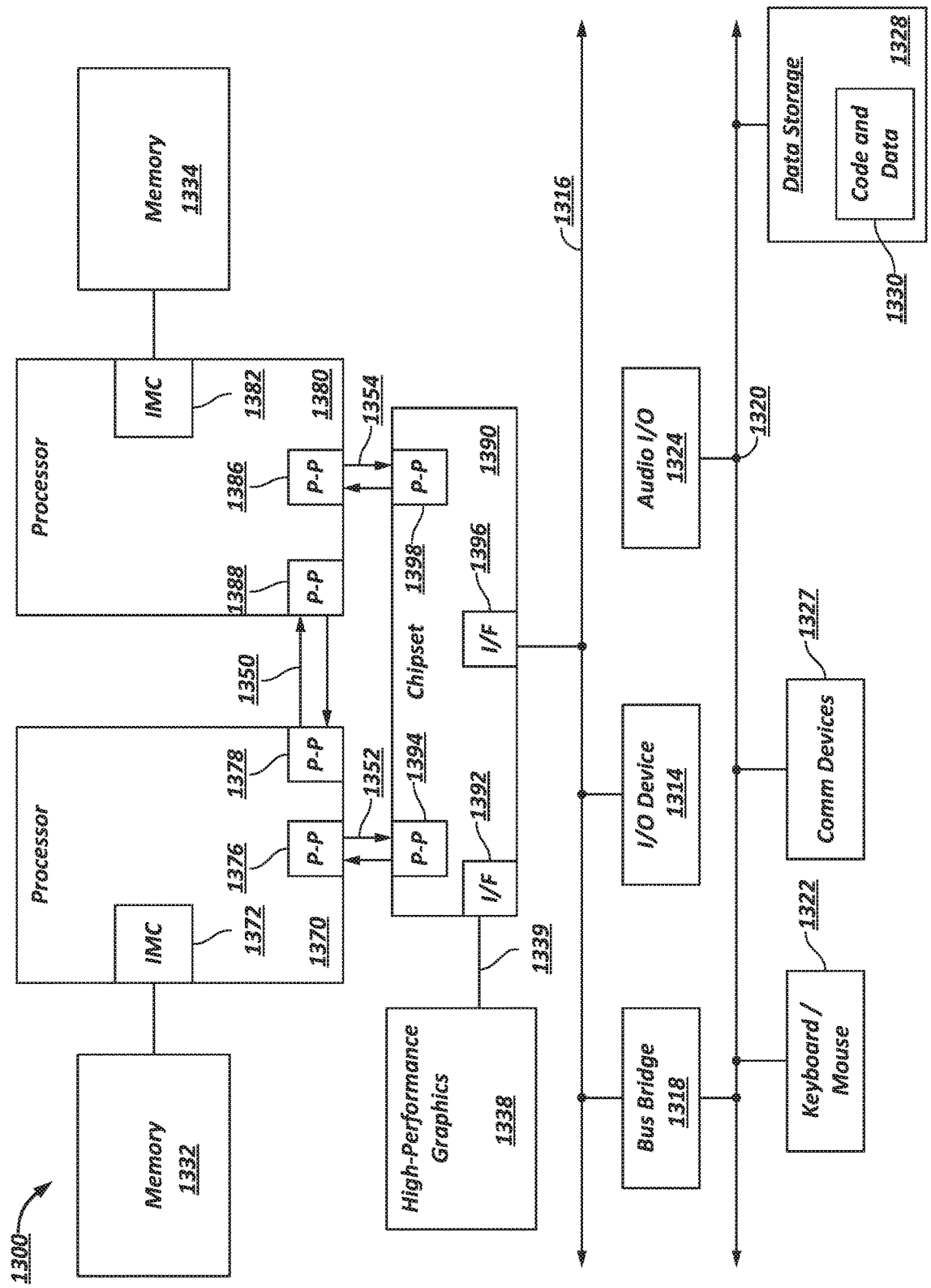
FIG. 13 illustrates an embodiment of a block for a computing system including multiple processor sockets.

Referring now to FIG. 13, shown is a block diagram of a second system 1300 in accordance with an embodiment of the present disclosure. As shown in FIG. 13, multiprocessor system 1300 is a point-to-point interconnect system, and includes a first processor 1370 and a second processor 1380 coupled via a point-to-point interconnect 1350. Each of processors 1370 and 1380 may be some version of a processor. In one embodiment, 1352 and 1354 are part of a serial, point-to-point coherent interconnect fabric, such as Intel's Quick Path Interconnect (QPI) architecture. As a result, the disclosure may be implemented within the QPI architecture.

While shown with only two processors 1370, 1380, it is to be understood that the scope of the present disclosure is not so limited. In other embodiments, one or more additional processors may be present in a given processor.

Processors 1370 and 1380 are shown including integrated memory controller units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 13, IMCs 1372 and 1382 couple the processors to respective memories, namely a memory 1332 and a memory 1334, which may be portions of main memory locally attached to the respective processors.

Processors 1370, 1380 each exchange information with a chipset 1390 via individual P-P interfaces 1352, 1354 using point to point interface circuits 1376, 1394, 1386, 1398. Chipset 1390 also exchanges information with a high-performance graphics circuit 1338 via an interface circuit 1392 along a high-performance graphics interconnect 1339.

A shared cache (not shown) may be included in either processor or outside of both processors; yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present disclosure is not so limited.

As shown in FIG. 13, various I/O devices 1314 are coupled to first bus 1316, along with a bus bridge 1318 which couples first bus 1316 to a second bus 1320. In one embodiment, second bus 1320 includes a low pin count (LPC) bus. Various devices are coupled to second bus 1320 including, for example, a keyboard and/or mouse 1322, communication devices 1327 and a storage unit 1328 such as a disk drive or other mass storage device which often includes instructions/code and data 1330, in one embodiment. Further, an audio I/O 1324 is shown coupled to second bus 1320. Note that other architectures are possible, where the included components and interconnect architectures vary. For example, instead of the point-to-point architecture of FIG. 13, a system may implement a multi-drop bus or other such architecture.

Using the various inertial and environmental sensors present in a platform, many different use cases may be realized. These use cases enable advanced computing operations including perceptual computing and also allow for enhancements with regard to power management/battery life, security, and system responsiveness.

For example with regard to power management/battery life issues, based at least on part on information from an ambient light sensor, the ambient light conditions in a location of the platform are determined and intensity of the display controlled accordingly. Thus, power consumed in operating the display is reduced in certain light conditions.

As to security operations, based on context information obtained from the sensors such as location information, it may be determined whether a user is allowed to access certain secure documents. For example, a user may be permitted to access such documents at a work place or a home location. However, the user is prevented from accessing such documents when the platform is present at a public location. This determination, in one embodiment, is based on location information, e.g., determined via a GPS sensor or camera recognition of landmarks. Other security operations may include providing for pairing of devices within a close range of each other, e.g., a portable platform as described herein and a user's desktop computer, mobile telephone or so forth. Certain sharing, in some implementations, are realized via near field communication when these devices are so paired. However, when the devices exceed a certain range, such sharing may be disabled. Furthermore, when pairing a platform as described herein and a smartphone, an alarm may be configured to be triggered when the devices move more than a predetermined distance from each other, when in a public location. In contrast, when these paired devices are in a safe location, e.g., a work place or home location, the devices may exceed this predetermined limit without triggering such alarm.

Responsiveness may also be enhanced using the sensor information. For example, even when a platform is in a low power state, the sensors may still be enabled to run at a relatively low frequency. Accordingly, any changes in a location of the platform, e.g., as determined by inertial sensors, GPS sensor, or so forth is determined. If no such changes have been registered, a faster connection to a previous wireless hub such as a Wi-Fi™ access point or similar wireless enabler occurs, as there is no need to scan for available wireless network resources in this case. Thus, a greater level of responsiveness when waking from a low power state is achieved.

It is to be understood that many other use cases may be enabled using sensor information obtained via the integrated sensors within a platform as described herein, and the above examples are only for purposes of illustration. Using a system as described herein, a perceptual computing system may allow for the addition of alternative input modalities, including gesture recognition, and enable the system to sense user operations and intent.

In some embodiments one or more infrared or other heat sensing elements, or any other element for sensing the presence or movement of a user may be present. Such sensing elements may include multiple different elements working together, working in sequence, or both. For example, sensing elements include elements that provide initial sensing, such as light or sound projection, followed by sensing for gesture detection by, for example, an ultrasonic time of flight camera or a patterned light camera.

Also in some embodiments, the system includes a light generator to produce an illuminated line. In some embodiments, this line provides a visual cue regarding a virtual boundary, namely an imaginary or virtual location in space, where action of the user to pass or break through the virtual boundary or plane is interpreted as an intent to engage with the computing system. In some embodiments, the illuminated line may change colors as the computing system transitions into different states with regard to the user. The illuminated line may be used to provide a visual cue for the user of a virtual boundary in space, and may be used by the system to determine transitions in state of the computer with regard to the user, including determining when the user wishes to engage with the computer.

In some embodiments, the computer senses user position and operates to interpret the movement of a hand of the user through the virtual boundary as a gesture indicating an intention of the user to engage with the computer. In some embodiments, upon the user passing through the virtual line or plane the light generated by the light generator may change, thereby providing visual feedback to the user that the user has entered an area for providing gestures to provide input to the computer.

Display screens may provide visual indications of transitions of state of the computing system with regard to a user. In some embodiments, a first screen is provided in a first state in which the presence of a user is sensed by the system, such as through use of one or more of the sensing elements.

In some implementations, the system acts to sense user identity, such as by facial recognition. Here, transition to a second screen may be provided in a second state, in which the computing system has recognized the user identity, where this second the screen provides visual feedback to the user that the user has transitioned into a new state. Transition to a third screen may occur in a third state in which the user has confirmed recognition of the user.

In some embodiments, the computing system may use a transition mechanism to determine a location of a virtual boundary for a user, where the location of the virtual boundary may vary with user and context. The computing system may generate a light, such as an illuminated line, to indicate the virtual boundary for engaging with the system. In some embodiments, the computing system may be in a waiting state, and the light may be produced in a first color. The computing system may detect whether the user has reached past the virtual boundary, such as by sensing the presence and movement of the user using sensing elements.

In some embodiments, if the user has been detected as having crossed the virtual boundary (such as the hands of the user being closer to the computing system than the virtual boundary line), the computing system may transition to a state for receiving gesture inputs from the user, where a mechanism to indicate the transition may include the light indicating the virtual boundary changing to a second color.

In some embodiments, the computing system may then determine whether gesture movement is detected. If gesture movement is detected, the computing system may proceed with a gesture recognition process, which may include the use of data from a gesture data library, which may reside in memory in the computing device or may be otherwise accessed by the computing device.

If a gesture of the user is recognized, the computing system may perform a function in response to the input, and return to receive additional gestures if the user is within the virtual boundary. In some embodiments, if the gesture is not recognized, the computing system may transition into an error state, where a mechanism to indicate the error state may include the light indicating the virtual boundary changing to a third color, with the system returning to receive additional gestures if the user is within the virtual boundary for engaging with the computing system.

As mentioned above, in other embodiments the system can be configured as a convertible tablet system that can be used in at least two different modes, a tablet mode and a notebook mode. The convertible system may have two panels, namely a display panel and a base panel such that in the tablet mode the two panels are disposed in a stack on top of one another. In the tablet mode, the display panel faces outwardly and may provide touch screen functionality as found in conventional tablets. In the notebook mode, the two panels may be arranged in an open clamshell configuration.

In various embodiments, the accelerometer may be a 3-axis accelerometer having data rates of at least 50 Hz. A gyroscope may also be included, which can be a 3-axis gyroscope. In addition, an e-compass/magnetometer may be present. Also, one or more proximity sensors may be provided (e.g., for lid open to sense when a person is in proximity (or not) to the system and adjust power/performance to extend battery life). For some OS's Sensor Fusion capability including the accelerometer, gyroscope, and compass may provide enhanced features. In addition, via a sensor hub having a real-time clock (RTC), a wake from sensors mechanism may be realized to receive sensor input when a remainder of the system is in a low power state.

In some embodiments, an internal lid/display open switch or sensor to indicate when the lid is closed/open, and can be used to place the system into Connected Standby or automatically wake from Connected Standby state. Other system sensors can include ACPI sensors for internal processor, memory, and skin temperature monitoring to enable changes to processor and system operating states based on sensed parameters.

In an embodiment, the OS may be a Microsoft® Windows® 8 OS that implements Connected Standby (also referred to herein as Win8 CS). Windows 8 Connected Standby or another OS having a similar state can provide, via a platform as described herein, very low ultra idle power to enable applications to remain connected, e.g., to a cloud-based location, at very low power consumption. The platform can supports 3 power states, namely screen on (normal); Connected Standby (as a default "off" state); and shutdown (zero watts of power consumption). Thus in the Connected Standby state, the platform is logically on (at minimal power levels) even though the screen is off. In such a platform, power management can be made to be transparent to applications and maintain constant connectivity, in part due to offload technology to enable the lowest powered component to perform an operation.

While this disclosure has been described with respect to a limited number of embodiments, those skilled in the art will appreciate numerous modifications and variations therefrom. It is intended that the appended claims cover all such modifications and variations as fall within the true spirit and scope of this present disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase "to" or "configured to," in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Various aspects and combinations of the embodiments are described above, some of which are represented by the following examples:

Example 1 is an apparatus that includes a port to send a request to a link partner across a bidirectional multilane link to change a link width of the multilane link in a first direction; receive an acknowledgment from the link partner to change the link width of the bidirectional multilane link in the first direction; reconfigure the bidirectional multilane link to send data on second number of lanes; and send or receive data to the link partner on the bidirectional multilane link on the second number of lanes in the first direction.

Example 2 may include the subject matter of example 1, wherein the request to the link partner to change the link width of the bidirectional multilane link comprises a link management data link layer packet (DLLP) that comprises a request for a change in link width, the link management DLLP comprising a desired link width in each direction of data traffic flow.

Example 3 may include the subject matter of any of examples 1-2, wherein the first number of lanes is greater than the second number of lanes.

Example 4 may include the subject matter of example 3, the port to send to the link partner a message to indicate a schedule for changing from the first number of lanes to the second number of lanes; send skip ordered sets (SKP OS) on the second number of lanes; and send data on the second number of lanes.

Example 5 may include the subject matter of any of examples 1-2, wherein the second number of lanes is greater than the first number of lanes.

Example 6 may include the subject matter of example 5, the port to send data on the first number of lanes; perform link training on lanes that are to become activated; and send data on the second number of lanes once additional lanes are activated.

Example 7 may include the subject matter of example 5, wherein the port comprises a downstream port, the downstream port to receive a request from an upstream port of the link partner to change a number of lanes of the multilane link from the first number to the second number; ignore the request from the upstream port; and await the acknowledgment from the link partner to change the link width of the bidirectional multilane link.

Example 8 may include the subject matter of example 5, wherein the request to change a link width of the bidirectional multilane link from a first number of lanes to a second number of lanes comprises a request to change a number of transmission lanes from a first number of transmission lanes to a second number of transmission lanes by activating a subset of total lanes available on the bidirectional multilane link. The port to perform link training on the subset of total lanes to be activated; sending skip ordered sets on the first number of lanes and on the subset of total lanes at a predetermined time; scheduling data transmission on the second number of lanes; and sending data on all active lanes on schedule.

Example 9 may include the subject matter of example 5, wherein the request to change a link width of the bidirectional multilane link from a first number of lanes to a second number of lanes comprises a request to change a number of reception lanes from a first number of reception lanes to a second number of reception lanes by activating a subset of total lanes available on the bidirectional multilane link. The port to confirm that link training is completed on subset of total lanes; schedule data reception on second number of lanes; and receive data on the second number of lanes.

Example 10 may include the subject matter of any of examples 1-2, wherein the first direction comprises one of a transmit direction or a receive direction.

Example 11 is a method that includes sending a request by a port to a link partner across a bidirectional multilane link to change a number of active lanes in a first direction on the bidirectional multilane link, the request comprising an indication of a desired link width; receiving an acknowledgment from the link partner to change the number of active lanes on the bidirectional multilane link to the desired link width in the first direction; configuring the bidirectional multilane link to operate using the desired link width; and sending or receiving data to the link partner using the desired link width.

Example 12 may include the subject matter of examples 11, wherein the first direction is one of a transmit direction or a receive direction.

Example 13 may include the subject matter of any of examples 11-12, wherein sending the request to the link partner comprises sending a link management data link layer packet (DLLP) to the link partner that comprises an indication of the desired link width.

Example 14 may include the subject matter of any of examples 11-12, wherein the first direction comprises a transmit direction, and the change in the active lanes comprises increasing the number of active lanes from a first number of active lanes to a second number of active lanes, the first number of active lanes greater than the second number of active lanes.

Example 15 may include the subject matter of example 14, wherein configuring the bidirectional multilane link comprises performing link training on inactive lanes; and scheduling data transmission on inactive lanes to coincide with future data transmission on active lanes.

Example 16 may include the subject matter of example 15, further comprising sending data on active lanes during link training of inactive lanes.

Example 17 may include the subject matter of any of examples 11-12, wherein the first direction comprises a receive direction, and the change in the active lanes comprises increasing the number of active lanes from a first number of active lanes to a second number of active lanes, the first number of active lanes greater than the second number of active lanes.

Example 18 may include the subject matter of example 17, wherein configuring the bidirectional multilane link comprises confirming link training on inactive lanes; and confirming scheduling of data reception on inactive lanes to coincide with future data transmission on active lanes.

Example 19 may include the subject matter of any of examples 11-12, wherein the desired link width comprises a reduction in the link with from a first number of lanes to a second number of lanes, first number of lanes greater than the second number of lanes.

Example 20 may include the subject matter of example 19, further comprising sending to the link partner a message to indicate a schedule for changing from the first number of lanes to the second number of lanes; deactivating a subset of the first number of lanes; and sending data on the second number of lanes.

Example 21 is a system comprising a host device comprising a downstream port; an endpoint device comprising an upstream port; and a bidirectional multilane link interconnecting the downstream port and the upstream port. The downstream port to send a request to the upstream port across the bidirectional multilane link to change a number of active lanes in a first direction on the bidirectional multilane link, the request comprising an indication of a desired link width, receive an acknowledgment from the upstream port to change the number of active lanes on the bidirectional multilane link to the desired link width in the first direction, configure the bidirectional multilane link to operate using the desired link width, and send or receiving data to the upstream port using the desired link width.

Example 22 may include the subject matter of example 21, the upstream port to send a request to the downstream port to change the link width of the bidirectional multilane link; receive the request from the downstream port to change the link width of the bidirectional multilane link; and send an acknowledgment to the downstream port acknowledging the request from the downstream port to change the link width.

Example 23 may include the subject matter of example 22, the downstream port to receive the request from the upstream port to change the link width of the bidirectional multilane link; ignore the request from the upstream port; and wait for the acknowledgment from the upstream port.

Example 24 may include the subject matter of example 21, wherein a request to the upstream port across the bidirectional multilane link to change a number of active lanes in a first direction on the bidirectional multilane link comprises a link management data link layer packet (DLLP) to the comprising an indication of the desired link width.

25. The system of claim 21, the downstream port to perform link training on lanes to be activated; and send or receive data on active lanes during link training of the lanes to be activated.

What is claimed is:

1. An apparatus comprising:
 a port to:
  send a request to a link partner across a bidirectional multilane link to change a link width of the multilane link in a first direction on the bidirectional multilane link and change a number of active lanes in a second direction on the bidirectional multilane link, the request comprising an indication of a desired first link width for the first direction and a desired second link width for the second direction, wherein the first direction is different from the second direction and the desired first link width is different from the desired second link width;
  receive an acknowledgment from the link partner to change the link width of the bidirectional multilane link to the desired first link width in the first direction and the desired second link width in the second direction;
  reconfigure the bidirectional multilane link to operate using the desired first link width in the first direction and the desired second link width in the second direction; and
  send or receive data to the link partner on the bidirectional multilane link using the desired first link width in the first direction and the desired second link width in the second direction.

2. The apparatus of claim 1, wherein the request to the link partner to change the link width of the bidirectional multilane link comprises a link management data link layer packet (DLLP) that comprises a request for a change in link width, the link management DLLP comprising a desired link width in each direction of data traffic flow.

3. The apparatus of claim 1, wherein a current number of lanes for the first direction is greater than a second number of lanes corresponding to the desired first link width.

4. The apparatus of claim 3, the port to:
 send to the link partner a message to indicate a schedule for changing from the current number of lanes to the second number of lanes;
 send skip ordered sets (SKP OS) on the second number of lanes; and
 send data on the second number of lanes.

5. The apparatus of claim 1, wherein a second number of lanes corresponding to the desired first link width is greater than a current number of lanes for the first direction.

6. The apparatus of claim 5, the port to:
 send data on the current number of lanes;
 perform link training on lanes that are to become activated; and
 send data on the second number of lanes once additional lanes are activated.

7. The apparatus of claim 5, wherein the port comprises a downstream port, the downstream port to:
 receive a request from an upstream port of the link partner to change a number of lanes of the multilane link from the current number to the second number;
 ignore the request from the upstream port; and
 await the acknowledgment from the link partner to change the link width of the bidirectional multilane link.

8. The apparatus of claim 5, wherein the request to change a link width of the bidirectional multilane link from a current number of lanes to a second number of lanes comprises a request to change a number of reception lanes from a first number of reception lanes to a second number of reception lanes by activating a subset of total lanes available on the bidirectional multilane link;
 the port to:
  confirm that link training is completed on subset of total lanes;
  schedule data reception on the second number of lanes; and
  receive data on the second number of lanes.

9. The apparatus of claim 5, wherein the request to change a link width of the bidirectional multilane link from a first number of lanes to a second number of lanes comprises a request to change a number of transmission lanes from a first number of transmission lanes to a second number of transmission lanes by activating a subset of total lanes available on the bidirectional multilane link;
 the port to:
  perform link training on the subset of total lanes to be activated;
  sending skip ordered sets on the first number of lanes and on the subset of total lanes at a predetermined time;
  scheduling data transmission on the second number of lanes; and
  sending data on all active lanes on schedule.

10. The apparatus of claim 1, wherein the first direction comprises one of a transmit direction or a receive direction.

11. A method comprising:
 sending a request to a link partner across a bidirectional multilane link to change a number of active lanes in a first direction on the bidirectional multilane link and change a number of active lanes in a second direction on the bidirectional multilane link, the request comprising an indication of a desired first link width for the first direction and a desired second link width for the second direction, wherein the first direction is different from the second direction and the desired first link width is different from the desired second link width;
 receiving an acknowledgment from the link partner to change the number of active lanes on the bidirectional multilane link to the desired first link width in the first direction and the desired second link width in the second direction;

configuring the bidirectional multilane link to operate using the desired first link width in the first direction and the desired second link width in the second direction; and sending or receiving data to the link partner using the desired first link width in the first direction and the desired second link width in the second direction.

12. The method of claim 11, wherein the first direction is one of a transmit direction or a receive direction.

13. The method of claim 11, wherein sending the request to the link partner comprises sending a link management data link layer packet (DLLP) to the link partner that comprises an indication of the first desired link width.

14. The method of claim 11, wherein the first direction comprises a transmit direction, and the change in the active lanes comprises increasing the number of active lanes from a first number of active lanes to a second number of active lanes, the first number of active lanes greater than the second number of active lanes.

15. The method of claim 14, wherein configuring the bidirectional multilane link comprises:
performing link training on inactive lanes; and
scheduling data transmission on inactive lanes to coincide with future data transmission on active lanes.

16. The method of claim 15, further comprising sending data on active lanes during link training of inactive lanes.

17. The method of claim 11, wherein the first direction comprises a receive direction, and the change in the active lanes comprises increasing the number of active lanes from a first number of active lanes to a second number of active lanes, the first number of active lanes greater than the second number of active lanes.

18. The method of claim 17, wherein configuring the bidirectional multilane link comprises:
confirming link training on inactive lanes; and
confirming scheduling of data reception on inactive lanes to coincide with future data transmission on active lanes.

19. The method of claim 11, wherein the desired first link width comprises a reduction in the link width from a first number of lanes to a second number of lanes, first number of lanes greater than the second number of lanes.

20. The method of claim 19, further comprising:
sending to the link partner a message to indicate a schedule for changing from the first number of lanes to the second number of lanes;
deactivating a subset of the first number of lanes; and
sending data on the second number of lanes.

21. A system comprising:
a host device comprising a downstream port;
an endpoint device comprising an upstream port; and
a bidirectional multilane link interconnecting the downstream port and the upstream port,
the downstream port to:
send a request to the upstream port across the bidirectional multilane link to change a number of active lanes in a first direction on the bidirectional multilane link and change a number of active lanes in a second direction on the bidirectional multilane link, the request comprising an indication of a desired first link width for the first direction and a desired second link width for the second direction, wherein the first direction is different from the second direction and the desired first link width is different from the desired second link width,
receive an acknowledgment from the upstream port to change the number of active lanes on the bidirectional multilane link to the desired first link width in the first direction and the desired second link width in the second direction,
configure the bidirectional multilane link to operate using the desired first link width in the first direction and the desired second link width in the second direction, and
send or receiving data to the upstream port using the desired first link width in the first direction and the desired second link width in the second direction.

22. The system of claim 21, the upstream port to:
send a request to the downstream port to change the link widths of the bidirectional multilane link;
receive the request from the downstream port to change the link widths of the bidirectional multilane link; and
send an acknowledgment to the downstream port acknowledging the request from the downstream port to change the link widths.

23. The system of claim 22, the downstream port to:
receive the request from the upstream port to change the link widths of the bidirectional multilane link;
ignore the request from the upstream port; and
wait for the acknowledgment from the upstream port.

24. The system of claim 21, wherein a request to the upstream port across the bidirectional multilane link to change a number of active lanes in a first direction on the bidirectional multilane link comprises a link management data link layer packet (DLLP) to the comprising an indication of the desired first link width.

25. The system of claim 21, the downstream port to:
perform link training on lanes to be activated; and
send or receive data on active lanes during link training of the lanes to be activated.

* * * * *